US011228677B1

(12) United States Patent
Cairns et al.

(10) Patent No.: US 11,228,677 B1
(45) Date of Patent: Jan. 18, 2022

(54) SYSTEMS AND METHODS FOR AUTHENTICATING A CALLER

(71) Applicant: United Services Automobile Association (USAA), San Antonio, TX (US)

(72) Inventors: Michael Justin Cairns, Helotes, TX (US); David Alexander Lilley, Schertz, TX (US); Robert Bruno Pace, Jr., San Antonio, TX (US); John Raymond Harris, San Antonio, TX (US); Joshua Samuel Leonard, San Antonio, TX (US); Yuibi Fujimoto, Helotes, TX (US); Kevin Kenneth Fiedler, Boerne, TX (US); Michael W. Lester, Fair Oaks Ranch, TX (US)

(73) Assignee: UNITED SERVICES AUTOMOBILE ASSOCIATION (USAA), San Antonio, TX (US)

( * ) Notice: Subject to any disclaimer, the term of this patent is extended or adjusted under 35 U.S.C. 154(b) by 0 days.

(21) Appl. No.: 16/930,179

(22) Filed: Jul. 15, 2020

Related U.S. Application Data

(63) Continuation of application No. 16/167,376, filed on Oct. 22, 2018, now Pat. No. 10,750,008, which is a (Continued)

(51) Int. Cl.
*H04M 3/38* (2006.01)
*H04W 12/06* (2021.01)
*H04M 3/51* (2006.01)

(52) U.S. Cl.
CPC ......... *H04M 3/382* (2013.01); *H04M 3/5166* (2013.01); *H04W 12/06* (2013.01)

(58) Field of Classification Search
CPC ... H04M 3/38–42076; H04M 3/42127–42187; H04M 3/42229–42272; H04M 3/42382; H04M 3/5166–52; H04M 3/15; H04M 3/46; H04M 3/47; H04M 2201/40–60; H04M 2203/10–1091;
(Continued)

(56) References Cited

U.S. PATENT DOCUMENTS 7,966,497 B2   6/2011   Gantman
9,065,824 B1   6/2015   Valdivia
(Continued)

OTHER PUBLICATIONS

U.S. Appl. No. 14/940,988, U.S. Pat. No. 10,142,464, filed Nov. 13, 2015, Nov. 27, 2018, Systems and Methods for Authenticating a Caller.
(Continued)

*Primary Examiner* — Hemant S Patel
(74) *Attorney, Agent, or Firm* — Perkins Coie LLP

(57) ABSTRACT

Methods and systems described in this disclosure receive a call from a caller, generate a first session through a first channel associated with the caller when the call is received and then send a request for authentication credentials to a device associated with the caller. In some embodiments, sending the request for authentication credentials generates a second session through a second channel associated with the caller. The caller can be authenticated to the first session using communication received during the second session through the second channel.

13 Claims, 21 Drawing Sheets

Representative Perspective

Related U.S. Application Data continuation of application No. 14/940,998, filed on Nov. 13, 2015, now Pat. No. 10,142,464.

(60) Provisional application No. 62/079,646, filed on Nov. 14, 2014.

(58) Field of Classification Search
CPC . H04M 2203/40; H04M 2203/60–655; H04W 12/06
USPC ............................. 379/67.1–88.28, 201.01; 455/412.1–426.1; 709/201–207, 217–248
See application file for complete search history.

(56) References Cited

U.S. PATENT DOCUMENTS

| | | | |
|---|---|---|---|
| 9,402,181 | B1 | 7/2016 | Yi |
| 9,420,103 | B1 | 8/2016 | Varman et al. |
| 10,142,464 | B1 * | 11/2018 | Cairns ................. H04M 3/4365 |
| 10,652,739 | B1 | 5/2020 | Lilley et al. |
| 10,750,008 | B1 * | 8/2020 | Cairns ................. H04M 3/5166 |
| 2003/0046541 | A1 | 3/2003 | Gerdes |
| 2004/0006742 | A1 | 1/2004 | Slocombe |
| 2006/0153357 | A1 | 7/2006 | Acharya et al. |
| 2007/0088713 | A1 | 4/2007 | Baxter et al. |
| 2009/0047928 | A1 | 2/2009 | Utsch |
| 2009/0222416 | A1 | 9/2009 | Tymoshenko et al. |
| 2009/0327101 | A1 | 12/2009 | Sayed |
| 2010/0100945 | A1 | 4/2010 | Ozzie |
| 2010/0197293 | A1 * | 8/2010 | Shem-Tov .............. H04L 63/08 455/420 |
| 2010/0325007 | A1 | 12/2010 | Ramaswamy |
| 2011/0142234 | A1 | 6/2011 | Rogers |
| 2011/0184827 | A1 | 7/2011 | Hubert |
| 2011/0277025 | A1 | 11/2011 | Counterman |
| 2011/0302641 | A1 | 12/2011 | Hald |
| 2012/0296679 | A1 | 11/2012 | Im |
| 2013/0066772 | A1 * | 3/2013 | Xiong ..................... G06F 21/43 705/39 |
| 2014/0189841 | A1 | 7/2014 | Metke |
| 2014/0241513 | A1 | 8/2014 | Springer |
| 2015/0106955 | A1 | 4/2015 | Soelberg |
| 2015/0215316 | A1 | 7/2015 | Zeljkovic |
| 2015/0334564 | A1 | 11/2015 | McClure |
| 2015/0381621 | A1 * | 12/2015 | Innes .................. H04L 63/0884 726/7 |
| 2016/0021534 | A1 | 1/2016 | Hong |
| 2016/0105546 | A1 * | 4/2016 | Keys ..................... H04M 7/003 379/88.01 |
| 2017/0034353 | A1 | 2/2017 | Bell |

OTHER PUBLICATIONS

U.S. Appl. No. 15/189,421, U.S. Pat. No. 10,652,739, filed Jun. 22, 2016, May 12, 2020, Methods and Systems for Transferring Call Context.

U.S. Appl. No. 16/167,376, filed Oct. 22, 2018, Systems and Methods for Authenticating a Caller.

U.S. Appl. No. 16/870,896, filed May 8, 2020, Methods and Systems for Transferring Call Context.

Dejean et al., "A System for Converting PDF Documents into Structured XML Format," Document Analysis Systems, 7th International Workshop, DAS 2006, Nelson, New Zealand, Feb. 13-15, 2006, Proceedings, pp. 129-140.

* cited by examiner

FIG. 11A

SYSTEMS AND METHODS FOR AUTHENTICATING A CALLER

CROSS-REFERENCE TO RELATED APPLICATIONS

This application is a Continuation of U.S. patent application Ser. No. 16/167,376, filed on Oct. 22, 2018, entitled "SYSTEMS AND METHODS FOR AUTHENTICATING A CALLER," now allowed, which is a Continuation of U.S. patent application Ser. No. 14/940,998, filed on Nov. 13, 2015, entitled "SYSTEMS AND METHODS FOR AUTHENTICATING A CALLER," now U.S. Pat. No. 10,142,464, issued Nov. 27, 2018, which claims priority to U.S. Provisional Application No. 62/079,646, filed on Nov. 14, 2014, entitled "SYSTEM, METHOD AND APPARATUS FOR A CALL CENTER," all of which are hereby incorporated by reference in their entireties for all purposes.

TECHNICAL FIELD

Various embodiments of the present disclosure generally relate to authentication. More specifically, various embodiments of the present disclosure relate to methods and systems for authenticating a caller.

BACKGROUND

Customers often call into an organization to inquire about a product, service, or status of an account the customer holds with the organization. The call may be answered by a customer service representative or an Interactive Voice Response (IVR) system.

BRIEF DESCRIPTION OF THE DRAWINGS

Embodiments of the present disclosure will be described and explained through the use of the accompanying drawings, in which:

FIG. 11A depicts an example of a user interface from a representative perspective requesting the caller to authenticate via a website in accordance with various embodiments of the present disclosure;

DETAILED DESCRIPTION

Figure 1:
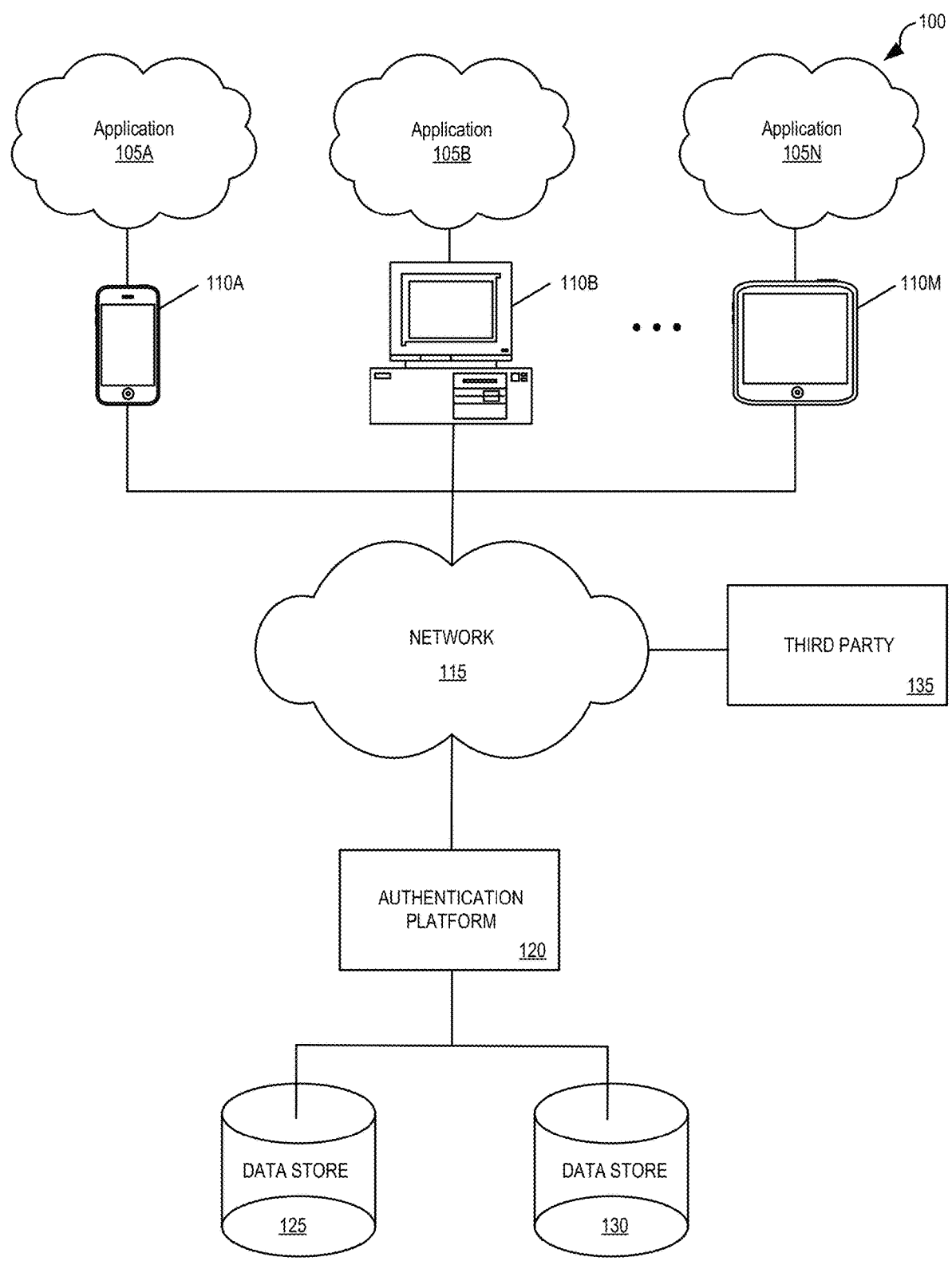
FIG. 1 illustrates an example of a network-based operating environment in accordance with various embodiments of the disclosure.

Various embodiments of the present disclosure generally relate to authentication. More specifically, various embodiments of the present disclosure relate to methods and systems for authenticating a caller.

When users call an organization on a standard voice line, organizations often have difficulty authenticating (i.e., identifying and verifying) the caller. For example, caller identification (ANI) can easily be spoofed and is thus not a reliable source of identification. Additionally, some callers attempt to bypass registration to be connected straight to a representative, resulting in the representative spending valuable time authenticating the caller. Authenticating the caller by asking challenge questions can be a lengthy process and, in some cases, is not a reliable method because much of the information can be found on the Internet. Moreover, depending on the type of transaction or information requested by the caller, additional authentication information may be required or desired.

Methods and systems disclosed herein allow users to be authenticated in a more secure and more efficient manner. In various embodiments, the user calls into the organization on one channel and can be sent, via one or more different channels, an authentication message that requests authentication credentials. After the authentication credentials from the user are received and verified, the user can be authenticated to the call.

Organizations allow users to access services and engage in activities through various channels. Examples of channels include modes of communication (e.g., a communications network) for exchanging data between devices. Devices may include, but are not limited to, computing devices, such as tablets, personal computers, and smartphones; point of sale devices; ATMs; connected smart devices, such as refrigerators, watches, and laptops; telephones, such as landline telephones or mobile phones; and face-to-face contact such as interaction between a user and an employee of the organization. Channels may also include software and firmware associated with the devices and communications devices, such as web portals, applications, networks, mobile applications, and instant messaging systems. Channels may also include hardware associated with the computing devices and telephones, such as the network hardware, credit card scanners, and retinal scanners.

Channels allow the user to engage in activities with an organization during a session. For example, a user may use a web portal or mobile application (i.e., a channel) to engage in activities, such as viewing an account, trading funds, purchasing insurance, or submitting or processing a negotiable instrument. Each channel may accept unique verifying information, and the verifying information may change depending upon the caller and/or the activity requested.

Once the user is identified (e.g., via device identification), the authentication request may be sent to a user device specified in a user profile. The request may be made via a push notification that requests authentication credentials through a mobile application (i.e., a "push authentication"). The push notification may include a link to an authentication page in a mobile application requesting authentication credentials from the user (e.g., biometrics, personal identification number (PIN)). The user is then authenticated to the call when the authentication credentials received through the mobile application are verified. In some embodiments, to participate in push authentication, the device associated with the user has to be qualified. For example, the device may have to be registered with the organization for a certain period of time (e.g., 30 days), the device may be required to have a mobile application downloaded, and the device may be required to be capable of receiving push notifications.

In other embodiments, the user is sent a text message supplying certain information (e.g., a code) that the user needs to relay to the enterprise system, IVR or representative for verification. The code may be received by the user on separate devices or in separate manners (i.e., using a third channel), providing additional security. In other embodiments, a device associated with a user is sent a message directing the user to a website where the user can provide authentication credentials.

This disclosure describes authentication systems and methods designed to increase the security of calls received by an organization. Various embodiments may provide one or more of the following technological improvements: 1) improved accuracy in identifying and verifying callers, resulting in improved security; 2) increased efficiency in authenticating a caller, resulting in a shorter call time; 3) real-time or near real-time notification of a fraud event; and 4) an authentication process that is adaptable to multiple channels, including mobile applications, websites, and SMS messages.

In the following description, numerous specific details are set forth to provide a thorough understanding of embodiments of the present disclosure. However, it will be apparent on reading the disclosure to one skilled in the art that embodiments may be practiced without some of these specific details.

Moreover, the techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions that may be used to program a computer (or other electronic devices) to perform a process. The machine-readable medium may include, but is not limited to, floppy diskettes, optical discs, compact disc read-only memories (CD-ROMs), magneto-optical discs, ROMs, random-access memories (RAMs), erasable programmable read-only memories (EPROMs), electrically erasable programmable read-only memories (EEPROMs), magnetic or optical cards, flash memory, or other types of machine-readable media suitable for storing electronic instructions.

FIG. 1 illustrates an example of a network-based operating environment 100 in which some embodiments of the present disclosure may be used. As illustrated in FIG. 1, operating environment 100 may include applications 105A-105N running on one or more computing devices 110A-110M (such as a mobile device; a mobile phone; a telephone; a tablet computer; a mobile media device; a mobile gaming device; a vehicle-based computer; a dedicated terminal; a public terminal, desktop, or laptop computer; a kiosk; wearable devices such as a smartwatch; etc.). In some embodiments, applications 105A-105N may be stored on one or more computing devices 110A-110M or may be stored remotely on a server (in the "cloud"). These computing devices can include mechanisms for receiving and sending traffic by connecting through network 115 to third party 135, authentication platform 120, and data stores 125 and 130.

Computing devices 110A-110M may be configured to communicate via the network 115 with authentication platform 120. In some embodiments, computing devices 110A-110M can retrieve or submit information to authentication platform 120 and run one or more applications with customized content retrieved by authentication platform 120 and data stores 125 and 130. For example, computing devices 110A-110M can execute a browser application or a customized client to enable interaction between the computing devices 110A-110M, authentication platform 120, and data stores 125 and 130.

Network 115 can be any combination of local area and/or wide area networks using wired and/or wireless communication systems. Network 115 can be or could use any one or more protocols/technologies: Ethernet, IEEE 802.11 or Wi-Fi, worldwide interoperability for microwave access (WiMAX), cellular telecommunication (e.g., 3G, 4G, 5G), CDMA, cable, digital subscriber line (DSL), etc. Similarly, the networking protocols used on network 115 may include multiprotocol label switching (MPLS), transmission control protocol/Internet protocol (TCP/IP), user datagram protocol (UDP), hypertext transport protocol (HTTP), simple mail transfer protocol (SMTP) and file transfer protocol (FTP). Data exchanged over network 115 may be represented using technologies, languages, and/or formats including hypertext markup language (HTML) or extensible markup language (XML). In addition, all or some links can be encrypted using conventional encryption technologies such as secure sockets layer (SSL), transport layer security (TLS), and Internet Protocol Security (IPsec).

Authentication platform 120 can be running on one or more servers and can be used to receive calls, determine identities of the callers, determine whether a qualified device is associated with the caller, send push notifications, send SMS messages, authenticate callers, store profiles and/or policies in data stores 125 and 130, and/or perform other activities. In some embodiments, authentication platform 120 includes various data processing and analytic tools that allow for identity verification. In some embodiments, authentication platform 120 is a server.

Authentication platform 120 may be communicably coupled with third party 135, data stores 125 and 130 and computing devices 110A-110M and may communicate, access, or receive data (e.g., device information, authentication information) from third party 135, computing devices 110A-110M and data stores 125 and 130. Authentication platform 120 may be associated with a membership organization (e.g., a financial institution or an insurance company), and the callers may be members of the membership organization.

Authentication platform 120 may be customized or calibrated by individual companies or service providers based on user needs and/or business objectives. For example, companies may have different business rules and/or different criteria for determining configurations and insurance rates.

Data stores 125 and 130 can be used to manage storage and access to user data such as logon history, registered devices, information relating to the registered devices (e.g., when the device was registered, whether the mobile application is downloaded on the device, networks the device connects to), user preferences, location information, security questions and answers, and other information. Data stores 125 and 130 may be data repositories of a set of integrated objects that are modeled using classes defined in database schemas. Data stores 125 and 130 may further include flat files that can store data. Authentication platform 120 and/or other servers may collect and/or access data from the data stores 125 and 130.

Third party 135 may be any type of service to identify devices, send push notifications or text messages, and/or perform biometric identification or verification services, or provide other functions related to identity and verification management. In some embodiments, third party 135 can collect data and provide the data to authentication platform 120.

Figure 2:
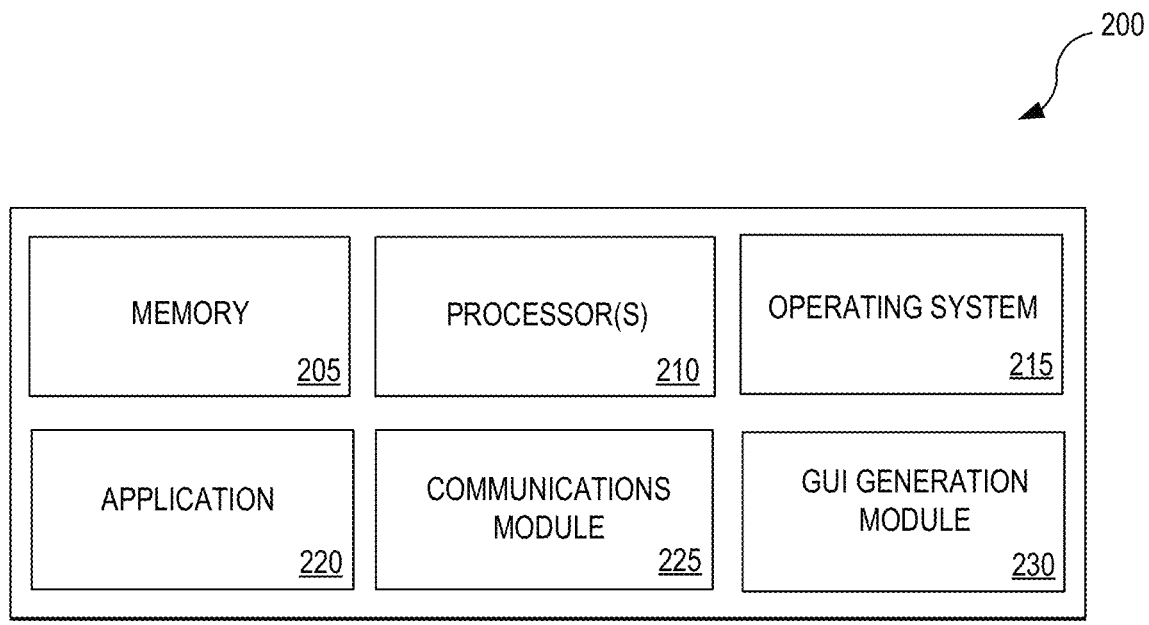
FIG. 2 illustrates various components of a computing device that may be used in accordance with one or more embodiments of the disclosure.

FIG. 2 illustrates a set of components 200 within computing device 110 according to one or more embodiments of the present disclosure. According to the embodiments shown in FIG. 2, computing device 110 can include memory 205, one or more processors 210, operating system 215, application 220, communications module 225, and graphical user interface (GUI) generation module 230. Other embodiments of the present disclosure may include some, all, or none of these modules and components, along with other modules, applications, and/or components. Still yet, some embodiments may incorporate two or more of these modules and components into a single module and/or associate a portion of the functionality of one or more of these modules with a different module. For example, in one embodiment, application 220 and communications module 225 can be combined into a single component.

Memory 205 can be any device, mechanism, or populated data structure used for storing information. In accordance with some embodiments of the present disclosure, memory 205 can encompass, but is not limited to, any type of volatile memory, nonvolatile memory, or dynamic memory. For example, memory 205 can be random-access memory, memory storage devices, optical memory devices, magnetic media, floppy disks, magnetic tapes, hard drives, single inline memory modules (SIMMs), synchronous dynamic random-access memory (SDRAM), dual inline memory modules (DIMMs), Rambus dynamic random-access memory (RDRAM), DDR RAM, small outline dual inline memory modules (SODIMMs), EPROM, EEPROM, compact discs, DVDs, and/or the like. In accordance with some embodiments, memory 205 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information that can be used as memory 205.

Memory 205 may be used to store instructions for running one or more applications or modules on processor(s) 210. For example, memory 205 could be used in one or more embodiments to house all or some of the instructions needed to execute the functionality of operating system 215, application 220, communications module 225, and GUI generation module 230.

Operating system 215 can provide a software package that is capable of managing the hardware resources of computing device 110. Operating system 215 can also provide common services for software applications running on processor(s) 210. In accordance with various embodiments, operating system 215 can coordinate resources for multiple applications 220 that allow a user to access and interact with authentication platform 120. For example, application 220 can include an application for financial services, a money transfer application, a social networking application, and a gaming application.

Application 220 can access a server and/or a platform associated with an organization (e.g., authentication platform 120) to display account data, display authentication requests and confirmations, and collect authentication information. For example, application 220 may be used to receive and take pictures of codes. In some embodiments, application 220 may collect biometric samples to identify the user, such as a face, voice, eye movement, fingerprints, behavioral biometrics (e.g., keystrokes), etc. In some embodiments, the codes and/or biometric information is analyzed on a device; and in other embodiments, the data is sent to a server by communications module 225 for analysis. Application 220 may include an authentication tab that is accessed when a deep link in a push notification is pressed. Application 220 may further direct a user to a login page to enter authentication credentials.

Communications module 225 can communicate with a third party (e.g., third party 135) and/or a server (e.g., authentication platform 120). For example, communications module 225 may send a communication to authentication platform 120 or third party 135 communicating an authentication request from a server requesting biometric information, login information, a personal identification number or other identifying information. The request may be received in the form of a push notification. The push notification may be routed through a native mobile application and/or it may include a deep link to an authentication tab in the mobile application. In some embodiments, the authentication request may be received in the form of a text message. The text message may include a code that the user can communicate to the organization (e.g., server, IVR, or representative), which provides the organization with information that verifies the user's identity. In some embodiments, the text message may include a link to a website or a login page of a mobile application allowing the user to provide login credentials.

GUI generation module 230 can generate one or more GUI screens that allow for interaction with a user. In at least one embodiment, GUI generation module 230 generates a graphical user interface receiving and/or conveying information to the user. For example, the GUI generation module 235 may display push notifications and text messages for the user.

Figure 3:
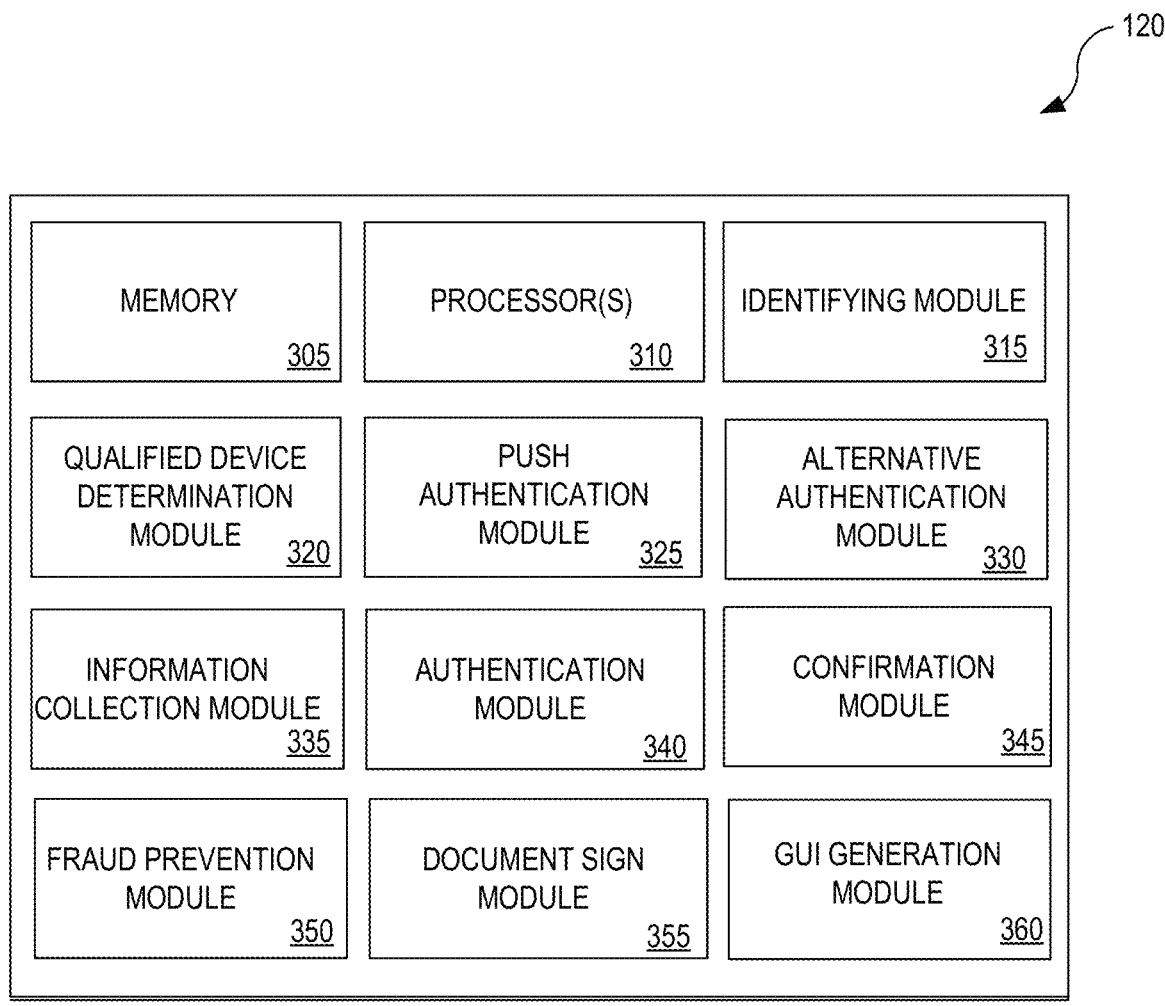
FIG. 3 illustrates various components of an authentication platform that may be used in accordance with various embodiments of the present disclosure.

FIG. 3 illustrates a set of components within authentication platform 120 according to one or more embodiments of the present disclosure. According to the embodiments shown in FIG. 3, authentication platform 120 can include memory 305, one or more processors 310, identifying module 315, qualified device determination module 320, push authentication module 325, alternative authentication module 330, information collection module 335, authentication module 340, confirmation module 345, fraud prevention module 350, document sign module 355, and GUI generation module 360. Other embodiments of the present disclosure may include some, all, or none of these modules and components, along with other modules, applications, and/or components. Still yet, some embodiments may incorporate two or more of these modules and components into a single module and/or associate a portion of the functionality of one or more of these modules with a different module.

Memory 305 can be any device, mechanism, or populated data structure used for storing information as described above for memory 205. Memory 305 may be used to store instructions for running one or more applications or modules on processor(s) 310. For example, memory 305 could be used in one or more embodiments to house all or some of the instructions needed to execute the functionality of identifying module 315, qualified device determination module 320, push authentication module 325, alternative authentication module 330, information collection module 335, authentication module 340, confirmation module 345, fraud prevention module 350, document sign module 355, and GUI generation module 360.

Identifying module 315 receives a call from a device associated with a caller. Identifying module 315 may determine an identity of the device based on the phone number, location of the call, a network the device is connected to, or other identifying information. The device information may be used to determine a caller associated with the device. For example, users may have profiles that include one or more devices associated with the user. Once the identity of the caller is determined, identifying module 315 may generate a first session, at the organization, that is associated with the caller. The first session is associated with a first type of channel (e.g., a voice channel). Identifying module 315 may communicate the profile information to qualified device determination module 320.

Qualified device determination module 320 may receive profile information for a caller from identifying module 315 and determine whether the caller is associated with any qualified devices. In some embodiments, the device is qualified if the person associated with the device has opted in or given a preference for push notifications. A qualified device can include a device that can receive push notifications, has downloaded a mobile application associated with the organization, and that has been registered with the organization for longer than a predetermined period of time. In some embodiments, a caller may have more than one qualified device associated with his or her profile. In some embodiments, user preferences may be applied. In other embodiments, as a rule, the push notification may be first sent to the device the user is calling from. Qualified device determination module 320 provides information regarding qualified devices to push authentication module 325. If there are no qualified devices associated with the caller, qualified device determination module 320 provides information regarding other devices to alternative authentication module 330.

Push authentication module 325 can send push notifications requesting authentication information from a caller. A push notification may be sent to the selected qualified device. The push notification may include a selection to close the push notification or to respond to the push notification. If the user selects "close" or ignores the push notification, then fraud prevention module 350 may later send a push notification asking the owner of the device to verify that the owner of the device called into the organization. If the caller instead chooses to respond to the push notification, the user may select the reply button, which may include a link to the mobile application on the caller's device directing the user to an authentication tab in the mobile application. The push notification may state that the company has received a request from a phone number and identify all or a portion of the phone number. The push notification may further identify the number of mobile devices the caller has registered with the company. The push notification may further ask whether the owner of the device made the request. As an example, the push notification may state the following: "We have received a request from the phone number ending in 5555 to verify your identity. We sent the request to the two mobile devices you have registered with Company ABC. Did you make this request?"

The authentication page or tab of the mobile application may request various forms of authentication. For example, the authentication page may be a quick logon page that requests a PIN. The PIN may be associated with the mobile application or other PIN the caller has established with the organization. In other embodiments, the authentication credentials could be an image or other type of a code (e.g., QR code, bar code, numeric code) that is displayed on a website or mobile application that is unique to the caller (i.e., the caller is logged into a website or mobile application). The code on the website or mobile application may be constantly changing so the caller does not have to type in credentials such as a password or username, preventing potential identification theft from keyloggers. In some embodiments, the authentication credentials can be an image of an item (e.g., a watch) that the caller previously took an image of and submitted to the organization. If the caller submits a real-time image or video of the item that is matched to the previous version, the caller can then be authenticated. In some embodiments, the push notification may be sent to a different user's device (e.g., a spouse) with a request for confirmation that the call is authorized. Authentication credentials responding to the push notification may be sent to authentication module 340.

By the caller's providing authentication credentials through a second channel, as discussed above (i.e., phone call is first channel, mobile application is second channel), the caller's identity can be verified in a more secure manner than by simply requesting a personal identification number or answers to security questions.

Alternative authentication module 330 can send a text message to a device associated with the caller when there are no qualified devices or when the caller's preferences state that the caller would rather receive text messages. The text message may request various forms of authentication. For example, the text message may include a code that the user can read (or otherwise communicate) to a representative or IVR for verification. In some embodiments, the code may be broken up between the text message to the device and a message to a second device (e.g., a smartwatch). During authentication, the caller could give the complete code, providing additional identity verification information. In some embodiments, a portion of the code could go to a second person's device (e.g., spouse). The text message may alternatively (or in addition) include a link to a website that launches the user to a website in which the user can provide authentication credentials (e.g., username, password, biometric information).

Information collection module 335 collects additional information that may be used to authenticate the user or to detect fraud. For example, the system may detect certain networks based on the networks that the caller's device is using and ask whether these networks are in the caller's home. This information can later be used to prevent fraud. For example, a network being used by the caller's device may be detected. The system can detect whether the network matches a network in the caller's profile. The network may also provide evidence of the caller's location. A representative can ask where the caller is located, and if the caller answers "at home" but the network does not match to the caller's home network, then the representative may need to request additional information to verify the caller's identity. When a network is associated with the device (e.g., "home" network), the caller's identity may be authenticated to a higher level, allowing the caller to partake in more risky transactions.

Authentication module 340 can receive the authentication credentials from push authentication module 325, alternative authentication module 330, and information collection module 335 and evaluate whether the caller's identity has been verified. In some embodiments, authentication credentials are specific to the type of message sent. The caller may be required to respond to the push authentication and/or provide authentication credentials via the website login, or directly to the representative within a certain period of time (e.g., 3 minutes) or the caller will have to provide other information to be authenticated.

In some embodiments, after authentication module 340 evaluates the caller's authentication credentials, regardless of whether the caller has been authenticated, authentication module 340 routes the call to a representative or IVR. If the caller has not been authenticated, the representative or IVR may ask additional questions and authenticate the caller or send the call to a fraud prevention team.

Confirmation module 345 can send a confirmation notification to the caller's device stating that the caller has been authenticated to the call. The notification may be a second tab via the mobile application, a push notification, text message, email or other message.

Fraud prevention module 350 can determine whether a call is fraudulent. For example, if the caller does not respond to a text message or a push notification or responds with incorrect authentication credentials, fraud prevention module 350 can send an additional text message or push notification to the device asking the caller to confirm that the call was authorized. When the message is in the form of a push notification, fraud prevention module 350 can provide an option for the caller to verify that the caller did call, and an option for the caller to state that the caller did not call. When the latter option is selected, the message response is routed to a fraud prevention database for further investigation.

Document sign module 355 can use the multiple channels to serve as an electronic signature in a document. In some embodiments, when a document needs to be signed, instead of providing a signature, a user can authenticate the document by providing authentication credentials (e.g., code) while on a call with a representative.

GUI generation module 360 is capable of generating one or more GUI screens that allow interaction with a user. In at least one embodiment, GUI generation module 360 generates a graphical user interface receiving information from and/or conveying information to the user. For example, GUI generation module 360 may display the caller's identity and preferences, the devices associated with the caller, and authentication information received or needed from the caller.

Figure 4:
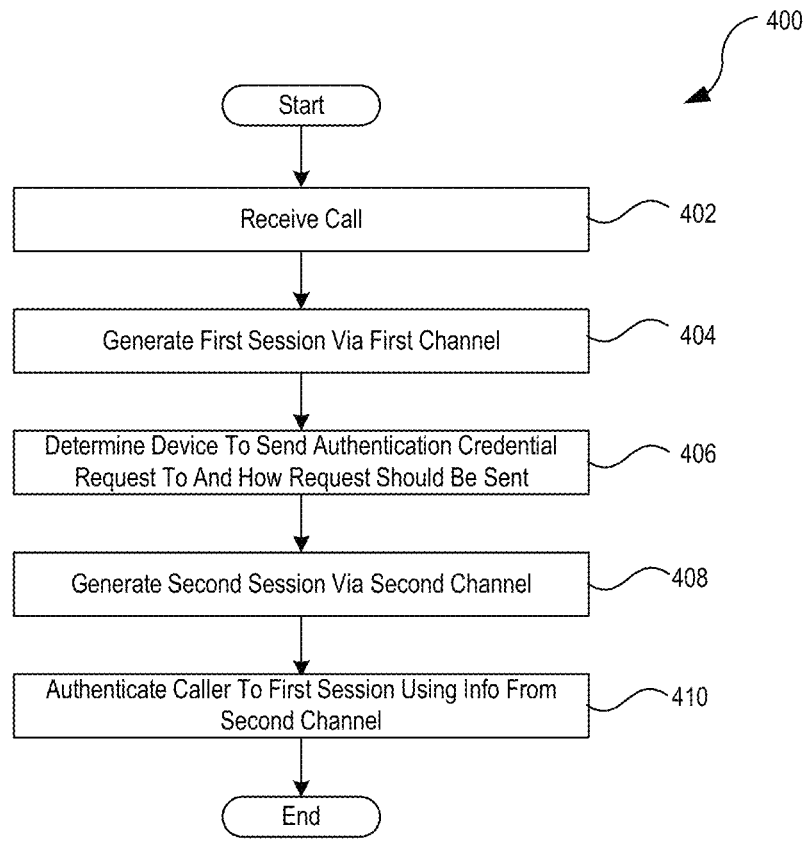
FIG. 4 is a flowchart illustrating a set of operations for authenticating a caller in accordance with various embodiments of the present disclosure.
Figure 5:
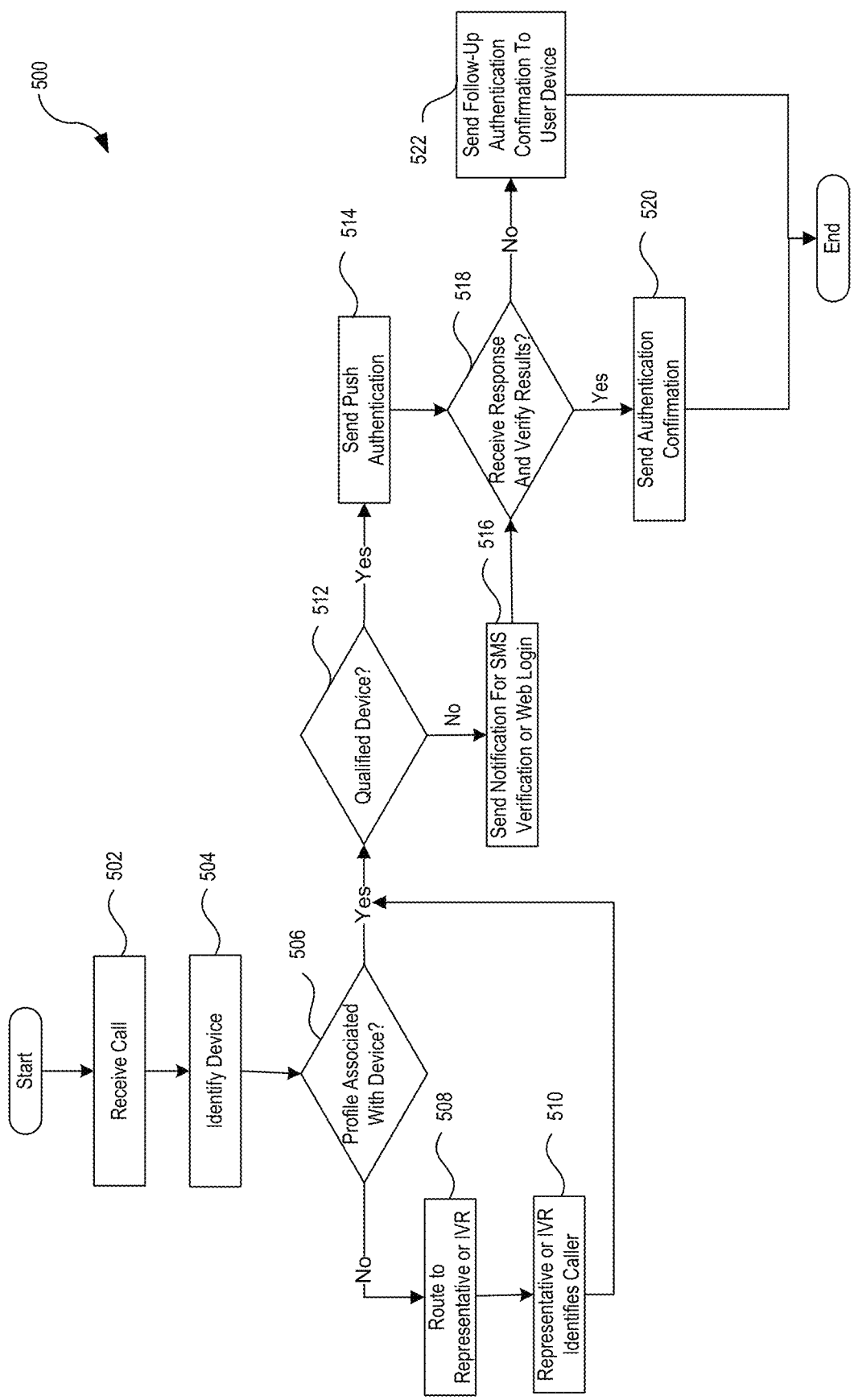
FIG. 5 is a flowchart illustrating a set of operations for authenticating a caller in accordance with various embodiments of the present disclosure.
Figure 6:
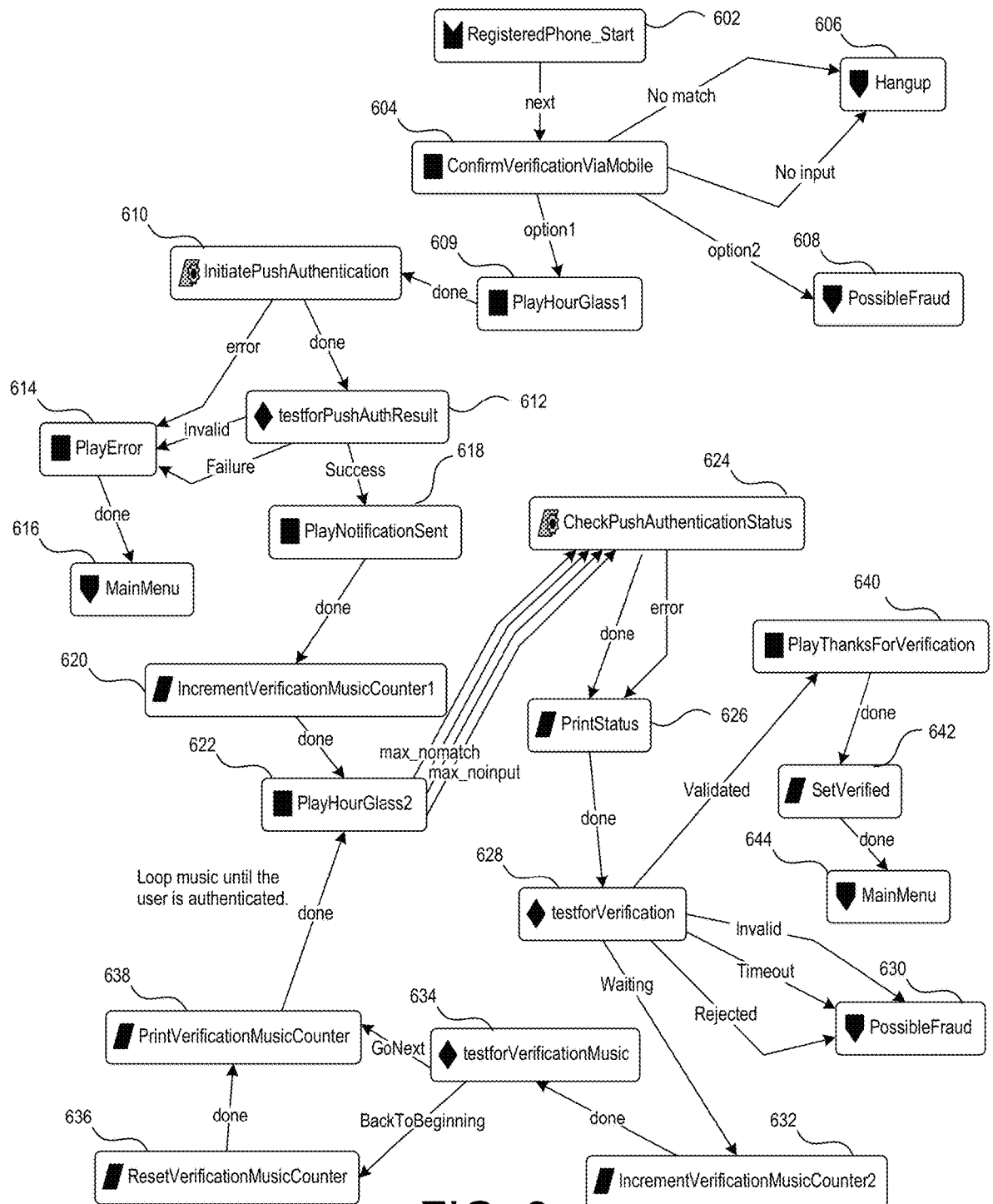
FIG. 6 is a flowchart illustrating a set of operations for authenticating a caller in accordance with various embodiments of the present disclosure.

FIGS. 4-6 are flowcharts illustrating sets of operations for authenticating a caller. In some embodiments, fewer than all of the operations in each set of operations are performed, whereas in other embodiments additional operations are performed. Moreover, in some embodiments, the operations may be performed in different orders or in parallel. The operations can be performed by device 200 illustrated in FIG. 2, third party 135, and/or various components of authentication platform 120 illustrated in FIG. 3.

Referring to the flowchart 400 of FIG. 4, receiving operation 402 receives a call from a caller. Generating operation 404 generates a first session with the caller via the first channel (i.e., voice channel on phone). Determining operation 406 determines which device associated with the caller a request for authentication credentials should be sent to and how the request should be sent. For example, the caller may have several devices associated (e.g., a smartwatch, smart phone, laptop, tablet) and may have specified a preference. The caller may have specified that the caller would like to receive push notifications or text messages on the smartphone as a first option, regardless of whether the caller is using a different device to call the organization. In some embodiments, determining the type of message to send depends on the devices associated with the caller. For example, in some embodiments, a push notification that is linked to the mobile application will not be sent to a device that has not downloaded the mobile application.

Generating operation 408 generates a second session via a second channel (e.g., SMS, website portal, mobile application). The second channel is different from the first channel in some way (e.g., a different device or network is used). After the authentication credentials are received and verified, authenticating operation 410 authenticates the caller to the first session using information from the second channel. Even though the authentication credentials may be requested from the second channel, in some embodiments, the authentication credentials can be sent from the user via the first channel (e.g., request is a text message with a code sent via a second channel, and caller reads code to representative via the first channel). In some embodiments, the mobile device rather than the server determines whether the caller is authenticated (e.g., analyzes biometrics such as behavioral biometrics or fingerprint, verifies a username/password) and sends the result to the server and/or representative.

In some embodiments, if the caller does not respond to the authentication request, the call can be transferred to a representative or IVR and the representative may ask whether the caller would like to be authenticated via the second channel. If the caller wishes to be authenticated via the second channel, the representative can send the authentication request to the caller's device. If the caller does not want to be authenticated via the second channel or does not have a qualifying device, the representative will ask for additional information on the first channel to authenticate the caller.

Referring to the flowchart 500 of FIG. 5, receiving operation 502 receives a call. Identifying operation 504 identifies the device (e.g., ANI, network, location). Decision operation 506 determines whether there is a profile associated with the device so that a caller can be identified. When a profile is associated with the device, decision operation 506 branches to decision operation 512 to determine whether a qualified device is associated with the caller. When there is no profile associated with the device, decision operation 506 branches to routing operation 508 which routes the call to a representative or an IVR to determine the caller's identity. Identifying operation 510 receives an identity from the IVR or the representative.

Once the caller's identity is determined (or if there is a profile associated with the device), decision operation 512 determines whether a qualified device is associated with the caller. A qualified device may be a device that is equipped to receive push notifications. When a qualified device is associated with the caller, decision operation 512 sends a push notification requesting authentication credentials (i.e., a "push authentication"), in sending operation 514. When no qualified devices are associated with the caller, decision operation 512 branches to sending operation 516 in which a notification for SMS verification or Web Login is sent to a device associated with the caller.

Once the notification has been sent to the caller, decision operation 518 determines whether authentication credentials have been received, and if so, whether the authentication credentials are verified. When the authentication credentials have been received and have been verified, decision operation 518 branches to sending operation 520 which sends an authentication confirmation to the caller's device informing the caller that the caller has been authenticated to the call. When the authentication credentials are not received and/or verified, decision operation 518 branches to sending operation 522 in which a follow-up authentication confirmation is sent to the device. The follow-up confirmation may ask whether the call was authorized. A fraud prevention team may follow-up on any calls that were not authorized.

FIG. 6 is a call flow for authenticating a caller using a push authentication process. When a call from a registered phone is received (602), the system can confirm the caller's identity via a mobile application (604). For example, the caller may be asked, "We see that you are calling from your mobile device in your profile. Would you like to verify via mobile app?" When the caller cannot be confirmed because his or her authentication credentials cannot be verified or because the caller did not provide an input, the call may be ended (606). If possible fraud is detected, the call can be sent to a fraud detection team (608) where the call can be ended if the call is fraudulent or where conventional question and answer authentication may be employed. Other business rules may be used to deal with calls in which fraud is suspected.

If the caller responds that the caller would like to be verified by mobile application, an hour glass is played (609) and a push authentication process is initiated (610). The hour glass may represent the wait time for the user to authenticate via the mobile device or other device so that the call is uninterrupted during this period of time A test is sent to the caller's mobile device (612). If the test fails or if the push authentication process could not be initiated, an error is communicated (e.g., spoken) to the caller (e.g., "A push notification could not be sent to your mobile device") (614). The caller may then be directed to the main menu (616). If the test is successful, the caller may receive the following message: "A push notification has been sent. If you don't receive a notification, press 0" (618). After the notification has been sent and the system waits for the authentication credentials to be sent, a music counter can be incremented (620) and a timer may be set (622). After the timer has expired, the push authentication status is checked (624). At this point, credentials have been either received or not received. A status is printed with either a status of "done" or "error" (626).

The credentials are tested for verification (628). When the credentials are either invalid or rejected, or a predetermined period of time has expired for the caller to input the credentials, the call is flagged for possible fraud (630). During the verification process, the music playing to the user can be incremented (632). To determine what music to play, a verification music test (634) determines whether the music should go to the next set of music or be reset to the beginning (636). Regardless, the music counter during the verification process is recorded (638). The music counter can be printed and the hour glass reset while waiting for the authentication credentials to be verified.

When the verification test (628) determines that the authentication credentials are verified, the caller is informed that he or she has been successfully authenticated (640). The call is flagged as verified (642) and the caller may be returned to the main menu (644).

Figure 7:
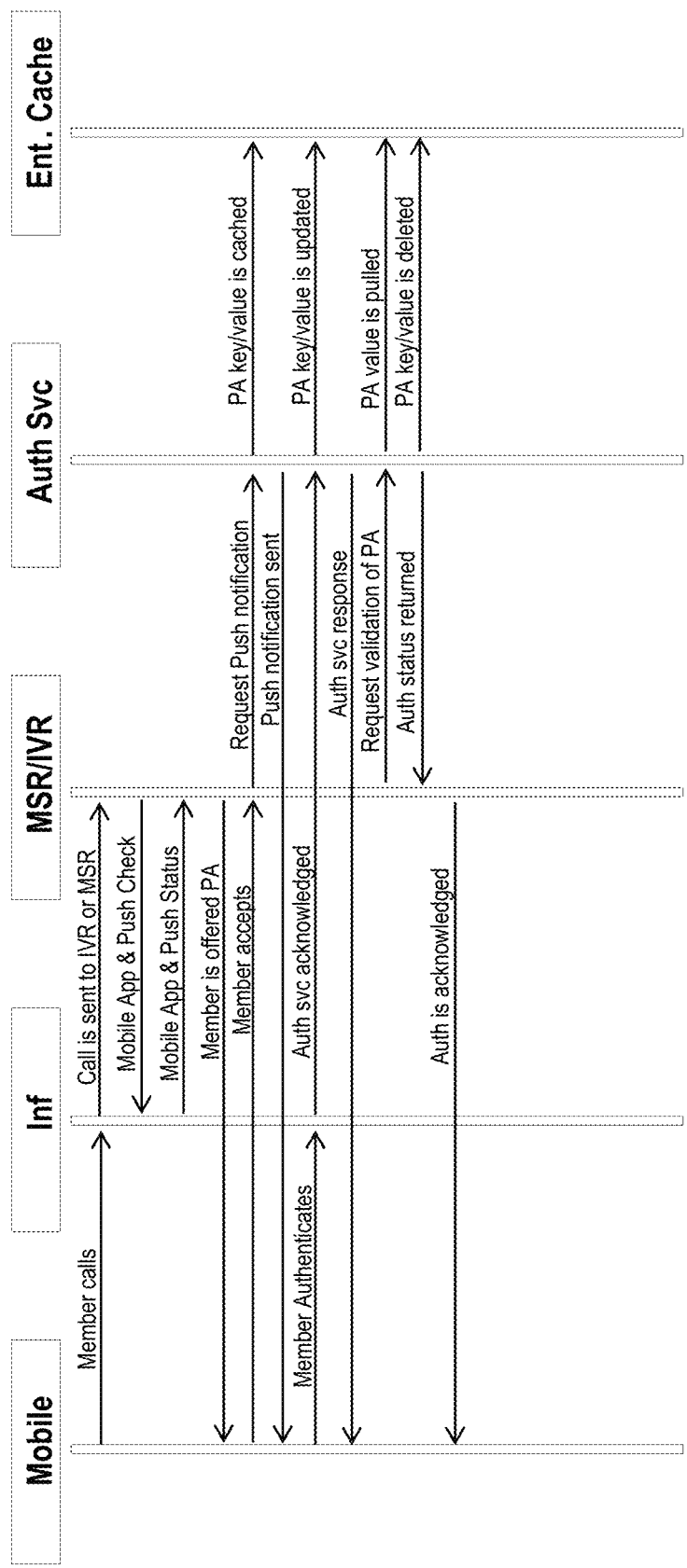
FIG. 7 is a sequence diagram illustrating a sequence of operations for authenticating a caller in accordance with various embodiments of the present disclosure.

FIG. 7 is a sequence diagram illustrating a sequence of operations for authenticating a caller. A member (i.e., caller) can call an organization which may be received into INF (i.e., web infrastructure that manages service calls) where the call can be sent to an IVR or an MSR (i.e., representative). The IVR or MSR can ask whether the member has downloaded the mobile application, which makes the device capable of receiving push notifications from an information source in the organization. The mobile application and push authentication status are sent to the MSR or IVR. Assuming that the device qualifies, the member is offered the push authentication service. The member then accepts the push authentication service.

The MSR or IVR sends a push notification request to an authorization service. The push authentication key/value representing an appropriate representation of the state of authentication (e.g., key/value could be "Authenticated, 1," "Declined, reason 3" where each value represents a different authentication code or failure code) is cached in the enterprise cache and the authorization service sends the push authentication request (i.e., push notification with a link to an authentication page) to the mobile device. When the member provides their authentication credentials to the organization and the authorization service, the authorization service acknowledges that the credentials are received and the push authentication key/value is updated in the enterprise cache. The authorization service sends a response with the key/value pair that defines an outcome of the authentication request returned (e.g., allow, deny) to the member's mobile device. The MSR or IVR then requests validation from the authentication service of the push authentication credentials sent from the mobile device to the organization. The authorization service polls the enterprise cache for the push authentication value. The authentication service then returns an authentication status to the MSR or IVR and the enterprise cache deletes the push authentication key/value. Assuming that the authentication credentials are valid, the MSR or IVR sends a message to the mobile device informing the member that he or she has been authenticated to the call.

Figure 8:
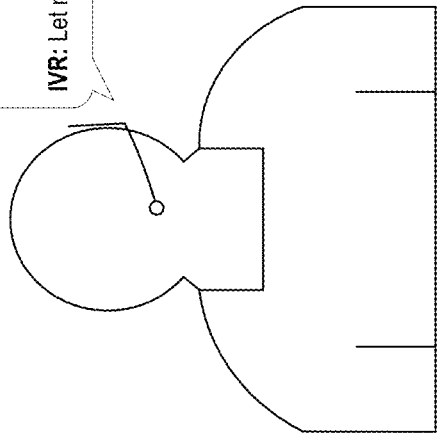
FIG. 8 depicts an example of a conversation between a caller and an IVR in accordance with various embodiments of the present disclosure.

FIG. 8 depicts an example of a conversation between a caller and an IVR. As depicted, when the caller calls into the organization, the caller may attempt to skip over the IVR by stating "representative." After the caller is directed to a representative, the representative can request authentication credentials, such as in FIG. 9A. In some embodiments, the authentication credentials are requested before the call reaches a representative.

Figure 9A:
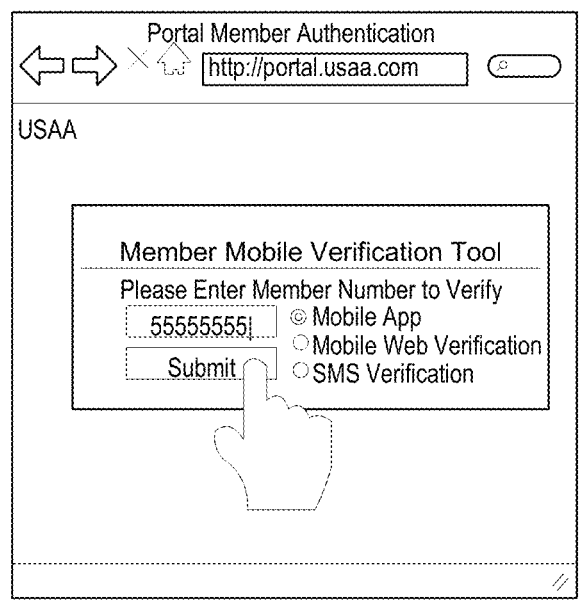
FIG. 9A depicts an example of a user interface from a representative perspective requesting the caller to authenticate via a mobile application in accordance with various embodiments of the present disclosure.
Figure 9B:
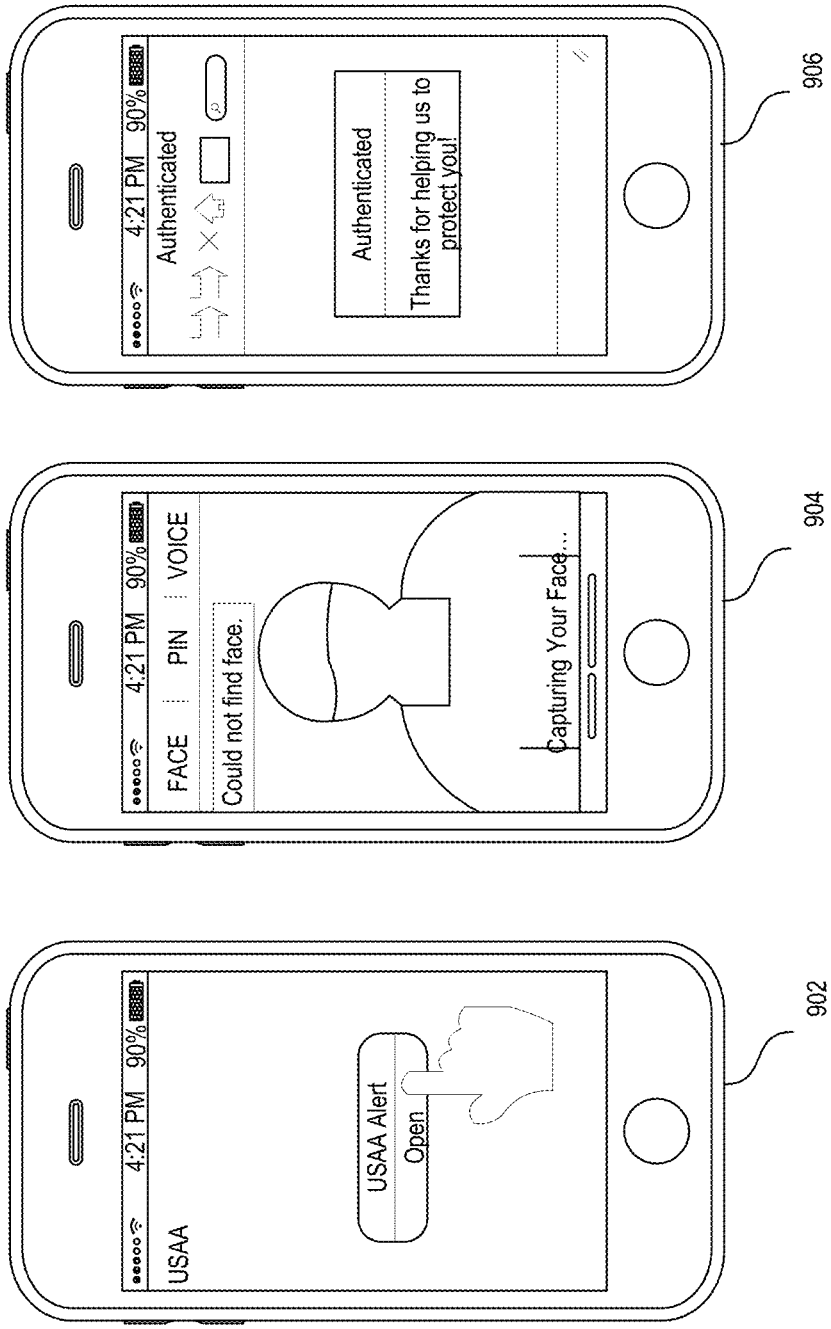
FIG. 9B depicts an example of user interfaces from a caller perspective when the caller is asked to authenticate via a mobile application in accordance with various embodiments of the present disclosure.
Figure 9C:
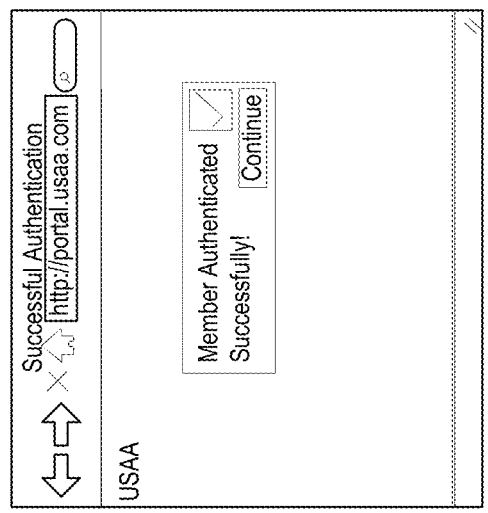
FIG. 9C depicts an example of a user interface from a representative perspective in accordance with various embodiments of the present disclosure.

FIGS. 9A-9C depict user interfaces from representative and caller perspectives when the caller is asked to authenticate via a mobile application.

FIG. 9A depicts a user interface a representative may see after a call is received from a caller. The representative may enter a user identification (e.g., determined from identifying the device used to make the call). The representative can select how to verify the caller: mobile application, mobile web verification, or SMS verification.

FIG. 9B depicts user interfaces from the caller's perspective when the representative selects "mobile app." The caller can receive a push notification which connects the caller to the mobile application for authentication as shown in FIG. 9B. The device receiving the push notification may be the device the caller used to call in with or the device may be a different device. The caller can select "open" to open the alert, which can direct the caller to an authentication tab in a mobile application (902). As shown, the caller can select whether to authenticate using face biometrics, voice biometrics, or a PIN (904). In the example shown in FIG. 9B, the caller has selected to authenticate using face biometrics. When the caller's identity is verified (i.e., the caller is authenticated) by a server or specially programmed computer, the caller can receive a notification that the caller has been authenticated (906).

FIG. 9C depicts a user interface from the representative perspective after the caller has been authenticated via the mobile application.

Figure 10A:
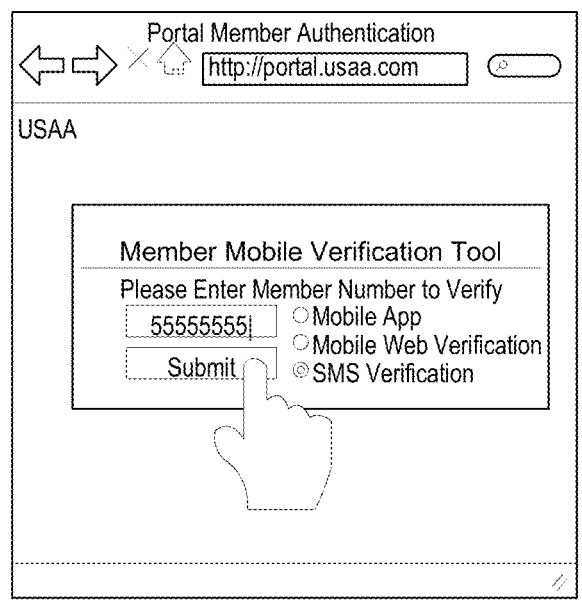
FIG. 10A depicts an example of a user interface from a representative perspective requesting the caller to authenticate via an SMS message in accordance with various embodiments of the present disclosure.
Figure 10B:
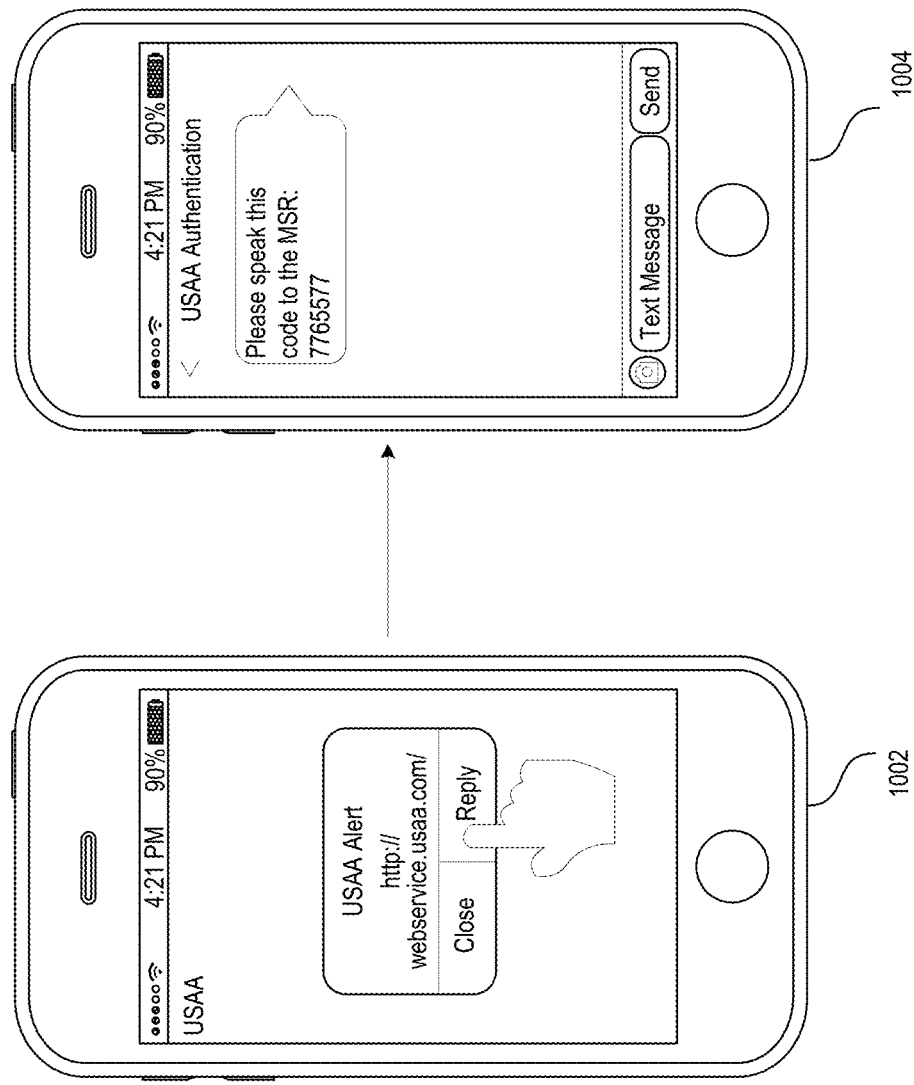
FIG. 10B depicts an example of user interfaces from a caller perspective when the caller is asked to authenticate via an SMS message in accordance with various embodiments of the present disclosure.
Figure 10C:
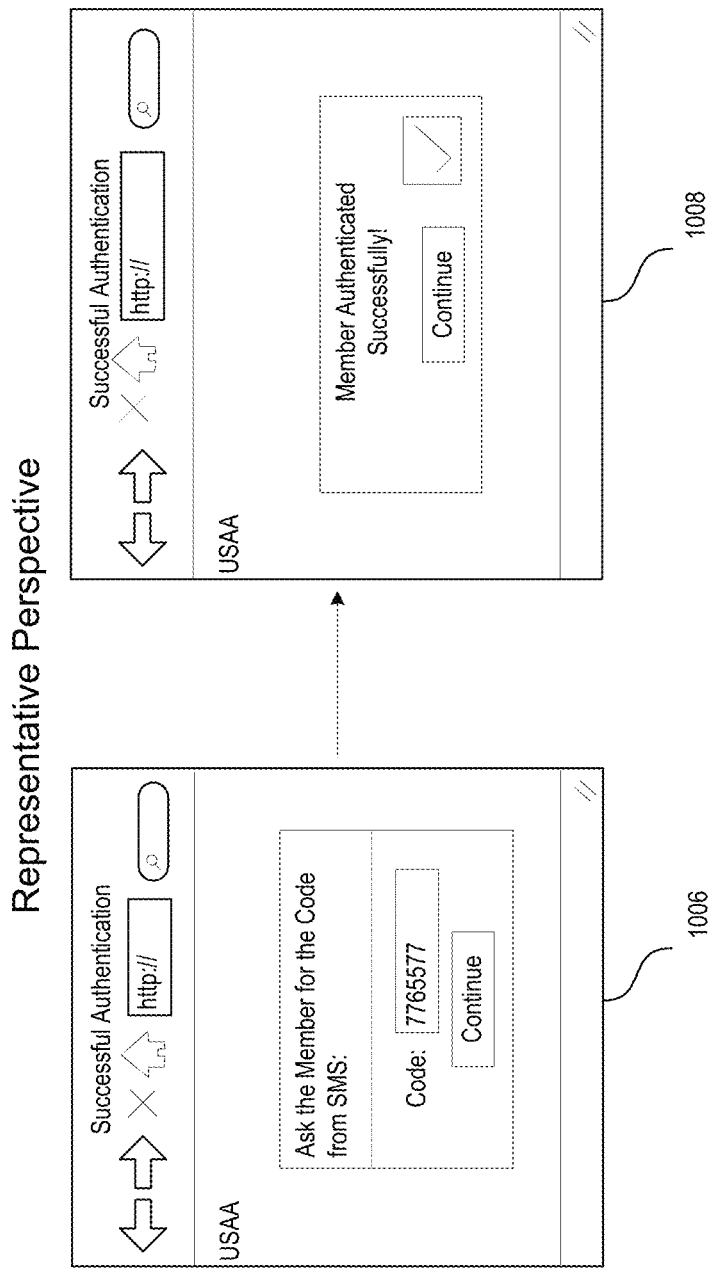
FIG. 10C depicts an example of a user interface from a representative perspective in accordance with various embodiments of the present disclosure.

FIG. 10A-10C depict user interfaces from representative and caller perspectives when the caller is asked to authenticate via an SMS message.

FIG. 10A depicts a user interface a representative may see after a call is received from a caller. Just as in FIG. 9A, the representative may enter a user identification (e.g., determined from identifying the device used to make the call). The representative can select how to verify the caller. In FIG. 10A, the representative selects to authenticate the user with an SMS verification (i.e., via text message).

FIG. 10B depicts user interfaces from the caller's perspective when the representative selects "SMS verification." The caller may see an alert from the organization on the caller's mobile device (1002). The message may be an SMS or MMS type of message through a mobile carrier that contains a temporary authentication code or link. When the caller selects "Reply," or otherwise indicates that the caller would like to respond to the alert (1002), a text message may be sent to the caller's device with a code or a portion of a code requesting the caller to speak (or otherwise provide) the code to the representative (1004). In some embodiments, a second portion of the code may be sent to a different device (e.g., smartwatch), and the caller can be authenticated when both portions of the code are spoken to or sent to the representative.

FIG. 10C depicts a user interface from the representative's perspective with an area for the representative to enter the code from the caller (1006). After the code has been verified, the representative may see a user interface stating the caller has been successfully authenticated (1008).

FIG. 11A-11D depict user interfaces from representative and caller perspectives when the caller is asked to authenticate via a mobile website.

Figure 11A:
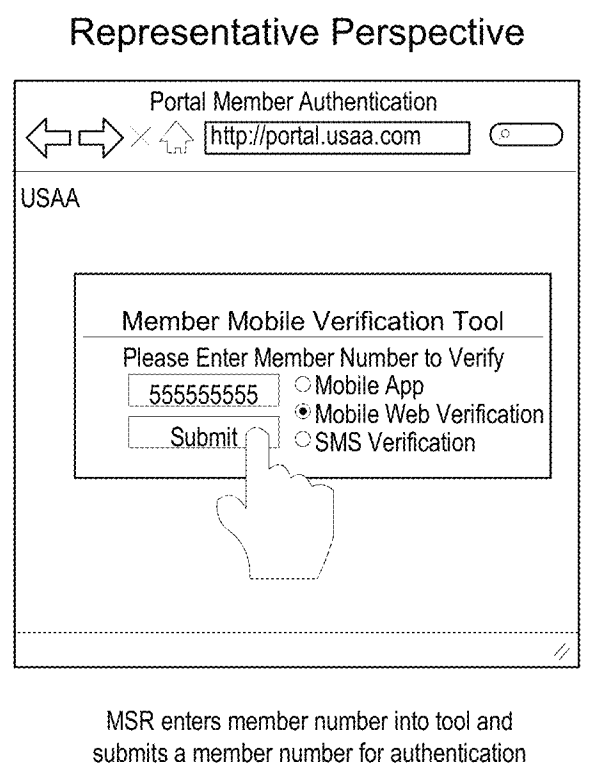

FIG. 11A depicts a user interface a representative may see after a call is received from a caller. Just as in FIGS. 9A and 10A, the representative may enter a user identification (e.g., determined from identifying the device used to make the call). The representative can select how to verify the caller. In FIG. 11A, the representative selects to authenticate the user with a mobile website.

Figure 11B:
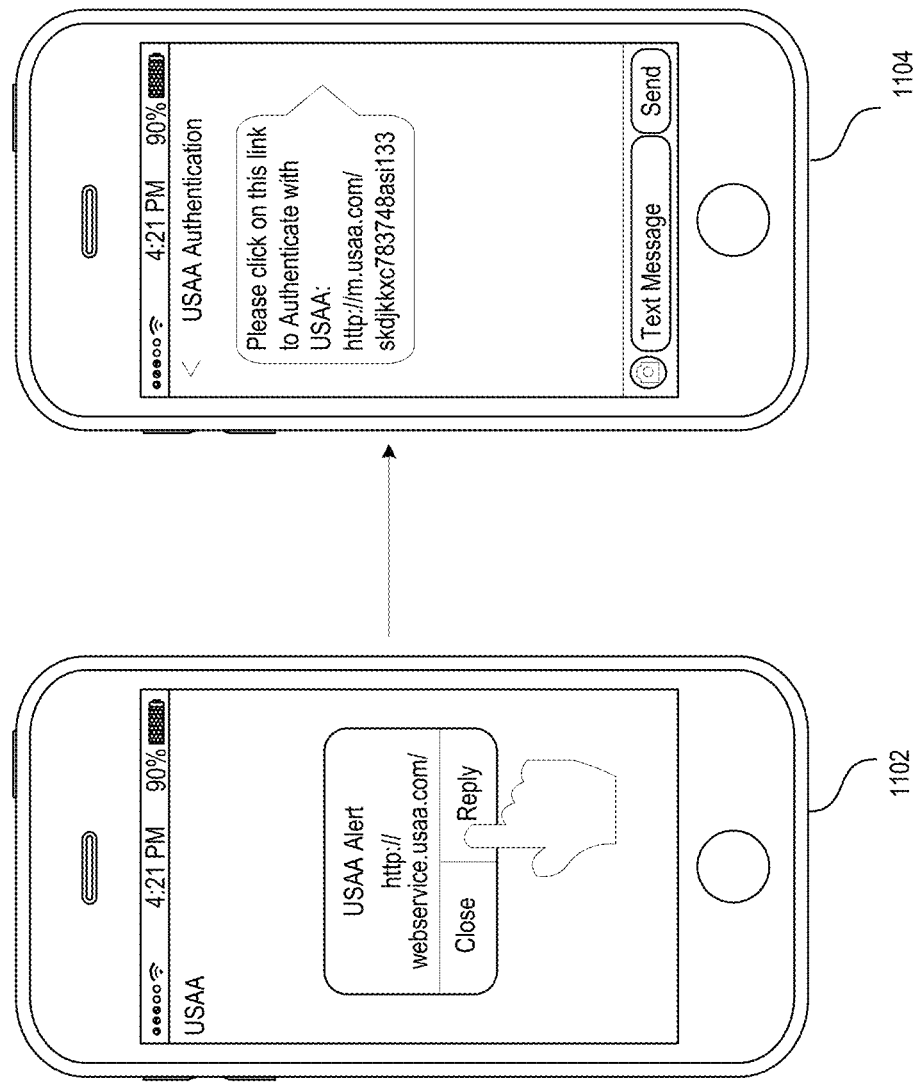
FIG. 11B depicts an example of user interfaces from a caller perspective when the caller is asked to authenticate via a website in accordance with various embodiments of the present disclosure.

FIG. 11B depicts user interfaces from the caller's perspective when the representative selects "Mobile Web Verification." The caller may see an alert from the organization on the caller's mobile device (1102). The message may be an SMS or MMS type of message through a mobile carrier that contains a temporary authentication code or link. When the caller selects "Reply," or otherwise indicates that the caller would like to respond to the message (1102), a text message may be sent to the caller's device with a link to a website requesting the caller to provide authentication credentials (e.g., login) to a website (1104).

Figure 11C:
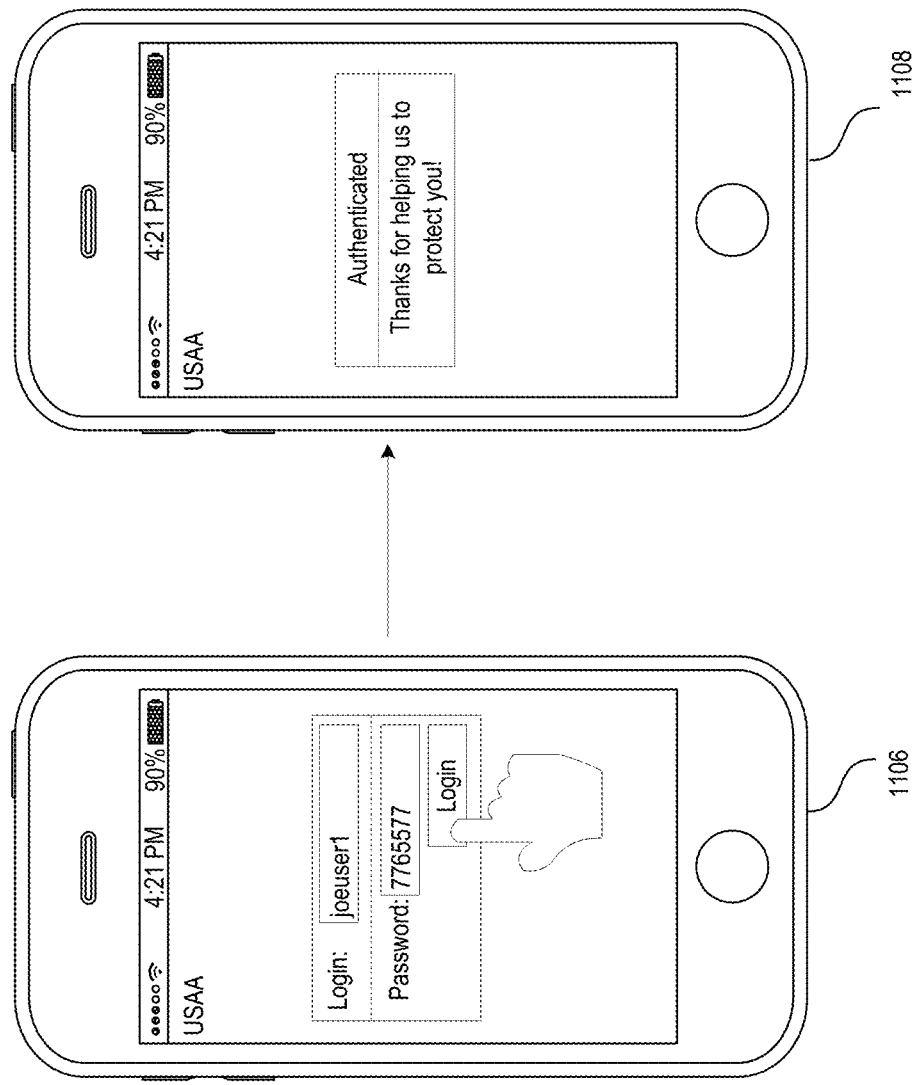
FIG. 11C depicts an example of a user interface from a representative perspective in accordance with various embodiments of the present disclosure.

FIG. 11C depicts user interfaces from the caller's perspective after the caller has selected the link to the website (1106). After the authentication credentials have been verified, the caller may see a user interface stating the caller has been successfully authenticated (1108).

Figure 11D:
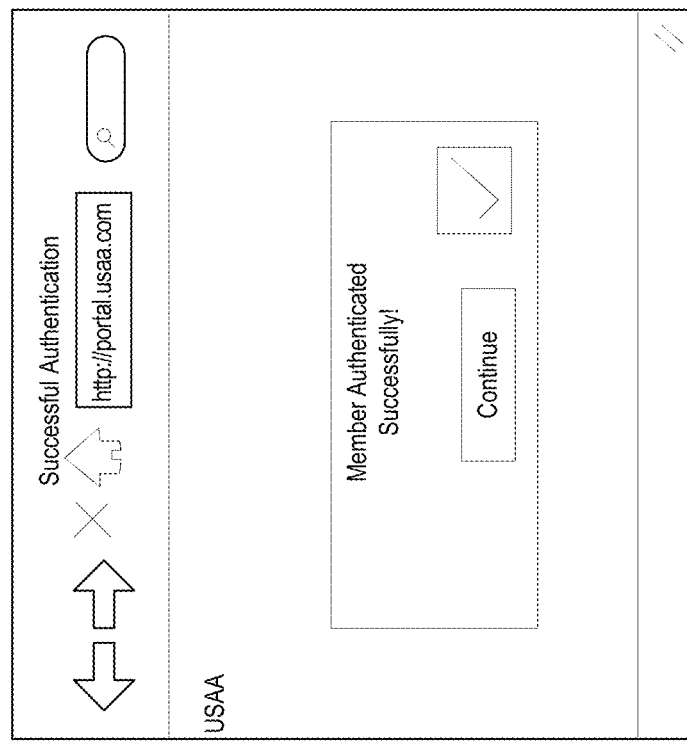
FIG. 11D depicts a user interface from the perspective of a representative in accordance with various embodiments of the present disclosure.

FIG. 11D depicts a user interface from the representative's perspective after the caller's credentials have been verified stating the caller has been successfully authenticated (1110).

Figure 12:
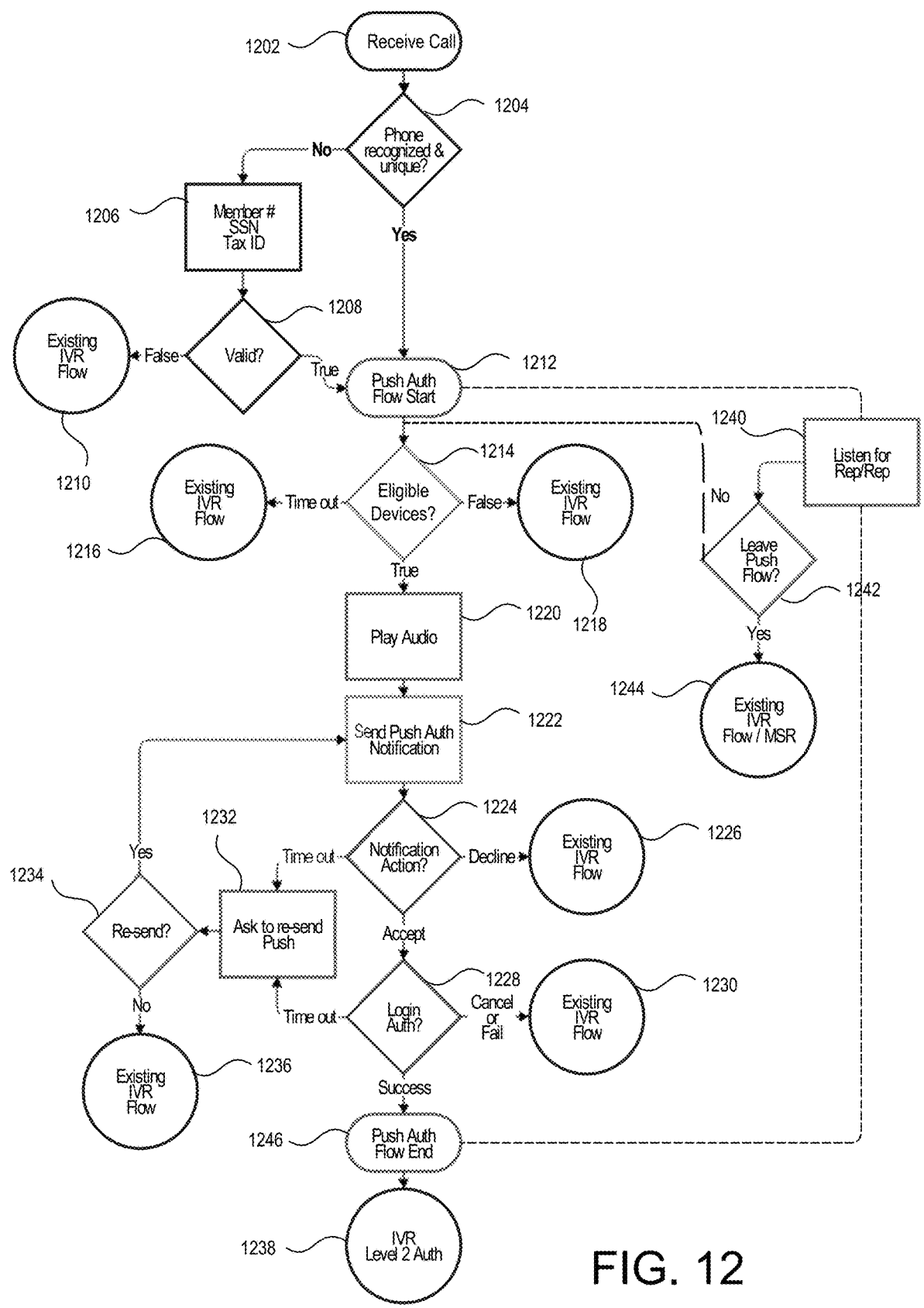
FIG. 12 is a flowchart illustrating a set of operations for authenticating a caller in accordance with various embodiments of the present disclosure.

FIG. 12 is a flowchart illustrating a set of operations for authenticating a caller. Receiving operation 1202 receives a call. Decision operation 1204 determines whether the device calling is recognized (e.g., by a phone number, device fingerprint) and unique (i.e., device is associated with only one member of the organization). When decision operation 1204 determines that the device is both recognized and unique, decision operation 1204 branches to push authentication operation 1208 to begin the push authentication verification process.

When decision operation 1204 determines that the device is not recognized or unique, decision operation 1204 branches to requesting operation 1206 where information such as the caller's member number, social security number, and/or tax identification number is requested. Decision operation 1208 determines whether the information is valid. When the information is invalid, decision operation 1208 branches to IVR operation 1210 where the call is directed to the IVR flow. When the information is valid, decision operation 1208 branches to push authentication operation 1212.

Push authentication operation 1212 begins the push authentication process. Decision operation 1214 determines whether the caller has associated mobile devices that are eligible for push authentication. If time runs out or if no eligible devices are associated with the caller, the call is routed to IVR operation 1216 or IVR operation 1218, respectively, where the call is directed to the IVR flow. On the other hand, if decision operation 1214 determines that one or more devices associated with the caller are eligible, playing operation 1220 plays audio informing the caller that a push notification has been sent to one or more of the caller's devices so that the user can be authenticated. Sending operation 1222 sends a push authentication notification to the one or more devices. Decision operation 1224 determines whether the caller has accepted the notification. When the caller declines the notification, decision operation 1224 branches to IVR operation 1226 where the call is routed to the IVR flow. When a certain time period has been exceeded with no response, decision operation 1224 branches to asking operation 1232 which asks the caller (or, in some embodiments, the organization) whether the push authentication should be re-sent to the one or more devices. Decision operation 1234 determines whether the push authentication should be re-sent. When the push authentication should be re-sent, decision operation 1234 branches to sending operation 1222 to re-send the push authentication. When the push authentication should not be re-sent, decision operation 1234 branches to IVR operation 1236 where the call is routed to the IVR flow.

When the caller accepts the notification, decision operation 1224 branches to decision operation 1228 which determines whether the authentication credentials are received and verified. When the authentication credentials are not received within a certain period of time, decision operation 1228 branches to asking operation 1232. When the authentication credentials are invalid or the caller cancels the push authentication process, decision operation 1228 branches to IVR operation 1230 where the call is routed to the IVR flow. When the authentication credentials are received and verified, decision operation 1228 branches to ending operation 1246. The call is then routed to an IVR with the caller having a higher level of authentication (e.g., level 2) such that the caller does not have to provide additional authentication in IVR operation 1238.

The IVR is constantly listening for the caller to say "hot words" or phrases, such as "representative" twice in a row, as shown in listening operation 1240. When the IVR identifies the caller speaking a hot word or phrase, the IVR can break out of the current flow, wherever that may be, and either route the caller to operation 1246 (e.g., when certain hot phrases are spoken) or ask the caller whether the call should continue through the IVR or whether the caller should be transitioned to a representative in decision operation 1242. The wide array of hot words and phrases can be stored as "grammar files."

Decision operation 1242 determines whether the push authentication flow should be ended. When the push authentication flow should be ended (e.g., the caller states that the caller would like to speak with a representative), decision operation 1242 branches to IVR operation 1224 where the call is routed to an IVR or a representative. When the push authentication flow should not be ended (e.g., the caller agrees to receive a push notification), decision operation 1242 branches to eligible operation 1214 to continue with the push authentication flow. When the caller speaks one or more of the hot words or phrases, as in listening operation 1240, the call is routed to ending operation 1246 where the push authentication flow is ended. Then, the call is routed to an IVR with a higher level of authentication (e.g., level 2) such that the caller does not have to provide additional authentication in IVR operation 1238, assuming that enough information has been collected for authentication. If the caller has not authenticated using push authentication or other methods (e.g., biometrics) after being routed to ending operation 1246 from listening operation 1240, the caller is routed to an representative for further authentication.

Figure 13:
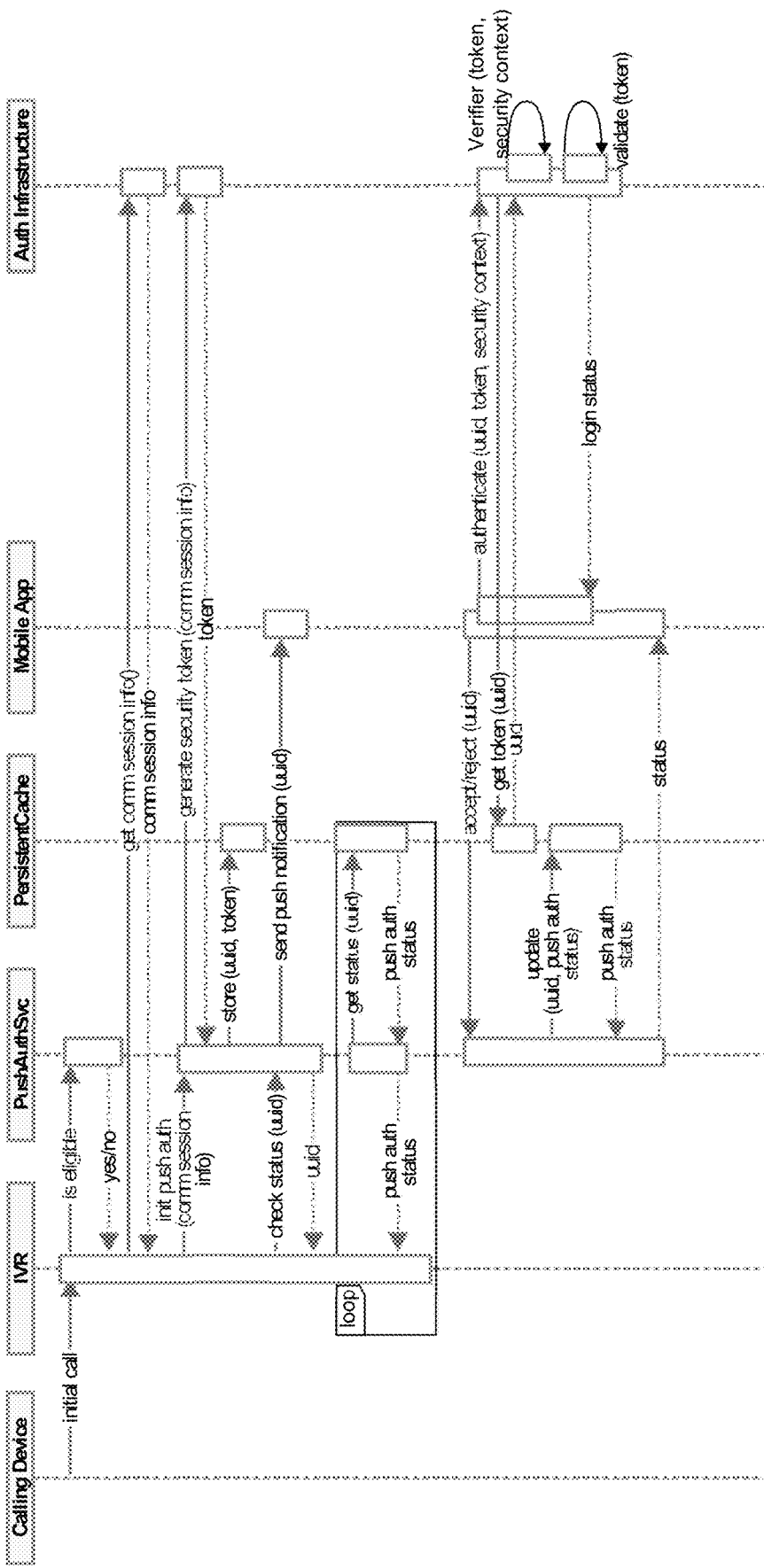
FIG. 13 is a sequence diagram illustrating a sequence of operations for authenticating a caller in accordance with various embodiments of the present disclosure.

FIG. 13 is a sequence diagram illustrating a sequence of operations for authenticating a caller. A calling device (e.g., mobile device) calls an organization and reaches an IVR. The IVR sends an eligibility request to a push authentication service ("PushAuthSvc") to determine whether the caller is eligible to receive a push notification to the caller's mobile application. When the caller is eligible to receive the push authentication notification to his or her mobile application, the IVR obtains the information about the current IVR communication session ("comm session info") from the authentication infrastructure ("Auth Infrastructure"). The IVR then passes the comm session information and a user identifier (e.g., a member number) to the PushAuthSvc to initiate the push authentication process.

The PushAuthSvc obtains a security token which can be a unique hashed string that identifies a specific communication session from the Auth Infrastructure. The security token can be created using a uniquely generated identification number, a timestamp, a member number, and the channels designated for the conversation (e.g., in this case, IVR to mobile). The security token can have a time-to-live set so that it can only be used for a very specific amount of time. Additional data and processes may be used in its creation.

Next, the PushAuthSvc generates a unique key (uuid) to store a push authentication status object and requests that a push notification message be generated with the key. The push authentication status object can store information about the current state of the authentication request, including the key, the security token, the current status of the authentication (e.g., "waiting", "confirmed", "rejected", "unknown", "error"), a times stamp for the last time the push authentication status object was updated, and a flag to indicate if the last requested action was completed successfully. The PushAuthSvc stores the security token, key and the push authentication status object in a temporary, persistent cache ("PersistentCache"). In some embodiments, the push authentication status object will be removed upon successful authentication or after a business configurable timeout (e.g., 2 minutes). The PushAuthSvc sends the push notification with the key to eligible devices associated with the caller. Then, the PushAuthSvc returns the key to the IVR.

The IVR uses the key to call the PushAuthSvc to loop and check the state of the push authentication status object (e.g., waiting, confirmed, rejected, unknown, error). If the IVR exceeds a predefined time period while waiting for the caller to authenticate (i.e., times out), the IVR can extend an offer to the caller to start the push authentication process over again. When the caller accepts the invitation to start the process over again, the PushAuthSvc generates a second unique key and the process begins again. When the caller rejects the invitation to start the process over again, the IVR routes the call to a representative who is trained in detecting and handling potential fraud. The representative is alerted that the caller rejected the push authentication request.

When the caller accepts the push authentication notification request, the caller is directed to provide authentication credentials through the mobile application. Once the caller confirms the authentication request on the mobile application, the mobile application sends an accept message to the PushAuthSvc.

When the caller is successfully authenticated (e.g., by providing login information into the mobile application), the key, comm session info, and a security context is passed with the authentication to the Auth Infrastructure. Security context refers to parameters and identifiers that are passed during the authentication process, which identify the request as originating from a specific channel (e.g., in this case, the IVR). An identifier indicating that the request originated from a Push Authentication can also be passed.

The Auth Infrastructure uses the key to retrieve the security token from the PushAuthSvc, which obtains the security token from the Persistent Cache. Using the security token, the Auth Infrastructure updates the IVR authentication with the security context information the caller used when providing security credentials (e.g., logging in from the mobile application) and verifies the security credentials. Then, the PushAuthSvc updates the push authentication status object to indicate a successful authentication. The IVR retrieves the updated push authentication status object that indicates a successful mobile authentication. The caller may be thanked for authenticating by the IVR. When the caller is forwarded to a representative or self-helps in the IVR, the caller will not need to re-authenticate.

When the caller fails the authentication (e.g., enters the incorrect authentication credentials into the mobile application), the IVR routes the call to a representative trained in detecting and handling potential fraud, and the representative is given the status that the caller failed the push authentication.

When the caller rejects the push authentication notification request on the mobile device, the mobile application sends a reject message to the PushAuthSvc. The PushAuthSvc updates the push authentication status object to indicate a rejected authentication. The IVR then routes the call to a representative that is trained in detecting and handling potential fraud and the representative is given the status that the caller rejected the push authentication request.

Computer System Overview

Figure 14:
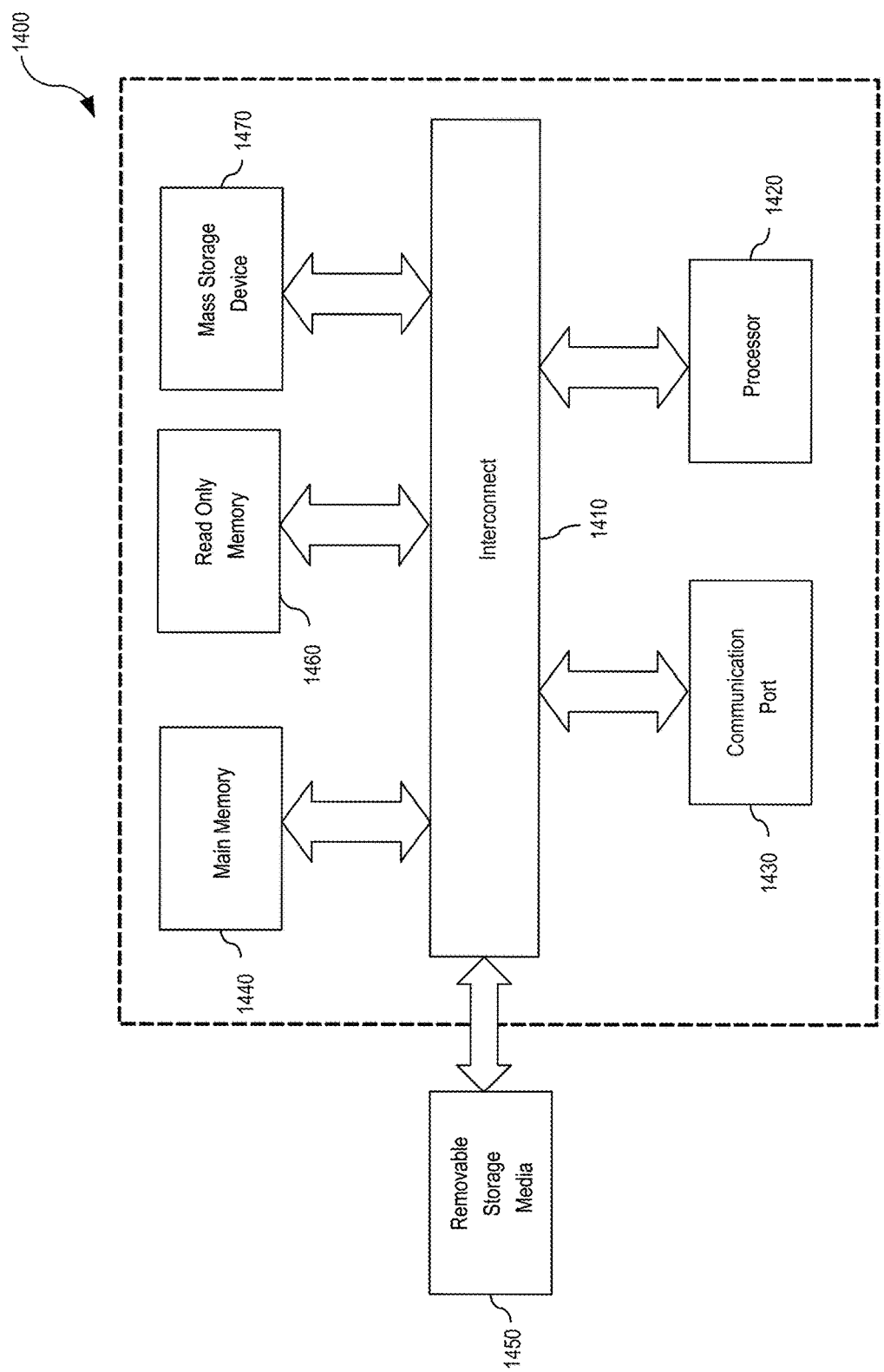
FIG. 14 illustrates an example of a computer system with which some embodiments of the present disclosure may be utilized.

Embodiments of the present disclosure include various steps and operations, which have been described above. A variety of these steps and operations may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 14 is an example of a computer system 1400 with which embodiments of the present disclosure may be utilized. According to the present example, the computer system 1400 includes an interconnect 1410, at least one processor 1420, at least one communication port 1430, a main memory 1440, a removable storage media 1450, a read only memory 1460, and a mass storage 1470.

Processor(s) 1420 can be any known processor, such as, but not limited to, an Intel® Itanium® or Itanium 2® processor(s), or AMD® Opteron® or Athlon MP® processor(s), or Motorola® lines of processors. Communication port(s) 1430 can be any of an RS-232 port for use with a modem-based dialup connection, a 10/100 Ethernet port, or a Gigabit port using copper or fiber. Communication port(s) 1430 may be chosen depending on a network such a Local Area Network (LAN), Wide Area Network (WAN), or any network to which the computer system 1400 connects.

Main memory 1440 can be Random Access Memory (RAM) or any other dynamic storage device(s) commonly known in the art. Read only memory 1460 can be any static storage device(s) such as Programmable Read Only Memory (PROM) chips for storing static information, such as instructions for processor 1420.

Mass storage 1470 can be used to store information and instructions. For example, hard discs such as the Adaptec® family of SCSI drives, an optical disc, an array of discs such as RAID, the Adaptec family of RAID drives, or any other mass storage devices may be used.

Interconnect 1410 communicatively couples processor(s) 1420 with the other memory, storage, and communication blocks. Interconnect 1410 can be a PCI/PCI-X- or SCSI-based system bus, depending on the storage devices used.

Removable storage media 1450 can be any kind of external hard-drives, floppy drives, IOMEGA® Zip Drives, Compact Disc-Read Only Memory (CD-ROM), Compact Disc-Re-Writable (CD-RW), Digital Video Disc-Read Only Memory (DVD-ROM).

The components described above are meant to exemplify some types of possibilities. In no way should the aforementioned examples limit the disclosure, as they are only exemplary embodiments.

Terminology

Brief definitions of terms, abbreviations, and phrases used throughout this application and the appendices are given below.

The terms "connected" or "coupled" and related terms are used in an operational sense and are not necessarily limited to a direct physical connection or coupling. Thus, for example, two devices may be coupled directly or via one or more intermediary media or devices. As another example, devices may be coupled in such a way that information can be passed therebetween, while not sharing any physical connection with one another. Based on the disclosure provided herein, one of ordinary skill in the art will appreciate a variety of ways in which connection or coupling exists in accordance with the aforementioned definition.

The phrases "in some embodiments," "according to some embodiments," "in the embodiments shown," "in other embodiments," "embodiments," and the like generally mean that the particular feature, structure, or characteristic following the phrase is included in at least one embodiment of the present disclosure and may be included in more than one embodiment of the present disclosure. In addition, such phrases do not necessarily refer to the same embodiments or to different embodiments.

If the specification states a component or feature "may," "can," "could," or "might" be included or have a characteristic, that particular component or feature is not required to be included or have the characteristic.

The term "responsive" includes completely or partially responsive.

The term "module" refers broadly to a software, hardware, or firmware (or any combination thereof) component. Modules are typically functional components that can generate useful data or other output using specified input(s). A module may or may not be self-contained. An application program (also called an "application") may include one or more modules, or a module can include one or more application programs.

The term "network" generally refers to a group of interconnected devices capable of exchanging information. A network may be as few as several personal computers on a Local Area Network (LAN) or as large as the Internet, a worldwide network of computers. As used herein, "network" is intended to encompass any network capable of transmitting information from one entity to another. In some cases, a network may be comprised of multiple networks, even multiple heterogeneous networks, such as one or more border networks, voice networks, broadband networks, financial networks, service provider networks, Internet Service Provider (ISP) networks, and/or Public Switched Telephone Networks (PSTNs) interconnected via gateways operable to facilitate communications between and among the various networks.

Also, for the sake of illustration, various embodiments of the present disclosure have herein been described in the context of computer programs, physical components, and logical interactions within modern computer networks. Importantly, while these embodiments describe various embodiments of the present disclosure in relation to modern computer networks and programs, the method and apparatus described herein are equally applicable to other systems, devices, and networks, as one skilled in the art will appreciate. As such, the illustrated applications of the embodiments of the present disclosure are not meant to be limiting, but instead are examples. Other systems, devices, and networks to which embodiments of the present disclosure are applicable include, but are not limited to, other types of communication and computer devices and systems. More specifically, embodiments are applicable to communication systems, services, and devices such as cell phone networks and compatible devices. In addition, embodiments are applicable to all levels of computing, from the personal computer to large network mainframes and servers.

In conclusion, the present disclosure discloses novel systems, methods, and arrangements for authenticating a caller. While detailed descriptions of one or more embodiments of the disclosure have been given above, various alternatives, modifications, and equivalents will be apparent to those skilled in the art without varying from the spirit of the disclosure. For example, while the embodiments described above refer to particular features, the scope of this disclosure also includes embodiments having different combinations of features and embodiments that do not include all of the described features. Accordingly, the scope of the present disclosure is intended to embrace all such alternatives, modifications, and variations as fall within the scope of the claims, together with all equivalents thereof. Therefore, the above description should not be taken as limiting.

What is claimed is:

1. A method of authenticating a caller comprising:
   receiving a call from a first device associated with a caller;
   generating a first session through a first channel associated with the caller when the call is received;
   determining whether to send a push notification or a text message based on a type of device and a length of time a second device associated with the caller has been registered with an organization;
   sending a request for authentication credentials to the second device associated with the caller,
      wherein sending the request comprises generating a second session though a second channel associated with the caller,
      wherein the request for authentication credentials is sent to the second device via the push notification or the text message, and
   authenticating the caller to the first session using communication received during the second session through the second channel,
      wherein the first channel and the second channel are different types of channels.

2. The method of claim 1, wherein the request for authentication credentials is sent to the second device via the text message, and wherein the method further comprises authenticating the caller to the call in response to the caller communicating a code to a representative or an interactive voice response system.

3. The method of claim 1, wherein the request for authentication credentials is sent to the second device via the push notification, wherein the push notification directs the second device to an authentication tab in a mobile application, and wherein the authentication credentials include biometric information or a personal identification number.

4. The method of claim 1, wherein the request for authentication credentials is sent to the second device via the push notification, and wherein the push notification directs the second device to an authentication tab in a mobile application, and wherein the authentication credentials include a code received from a third channel.

5. The method of claim 1, wherein the authentication credentials include an image of a code displayed via a website.

6. The method of claim 1, wherein the request for authentication credentials is sent to the second device via the text message, and wherein the text message includes a link to a login webpage, wherein the method further comprises authenticating the caller to the call when the caller successfully logs in on the login webpage.

7. A non-transitory, computer-readable storage medium comprising a set of instructions that, when executed by one or more processors, cause the one or more processors to perform operations comprising:
   receiving a call from a first device associated with a caller;
   generating a first session through a first channel associated with the caller when the call is received;
   determining whether to send a push notification or a text message based on a type of device and a length of time a second device associated with the caller has been registered with an organization;
   sending a request for authentication credentials to the second device associated with the caller,
      wherein sending the request comprises generating a second session though a second channel associated with the caller,
      wherein the request for authentication credentials is sent to the second device via the push notification or the text message, and
   authenticating the caller to the first session using communication received during the second session through the second channel,
      wherein the first channel and the second channel are different types of channels.

8. The non-transitory, computer-readable storage medium of claim 7, wherein the request for authentication credentials is sent to the second device via the text message, and wherein the operations further comprise authenticating the caller to the call in response to the caller communicating a code to a representative or an interactive voice response system.

9. The non-transitory, computer-readable storage medium of claim 7, wherein the request for authentication credentials is sent to the second device via the push notification, wherein the push notification directs the second device to an authentication tab in a mobile application, and wherein the authentication credentials include biometric information, or a personal identification number.

10. The non-transitory, computer-readable storage medium of claim 7, wherein the request for authentication credentials is sent to the second device via the push notification, and wherein the push notification directs the second device to an authentication tab in a mobile application, and wherein the authentication credentials include a code received from a third channel.

11. The non-transitory, computer-readable storage medium of claim 7, wherein the authentication credentials include an image of a code displayed via a website.

12. The non-transitory, computer-readable storage medium of claim 7, wherein the request for authentication credentials is sent to the second device via the text message, and wherein the text message includes a link to a login webpage, wherein the operations further comprise authenticating the caller to the call when the caller successfully logs in on the login webpage.

13. A system authenticating a caller, the system comprising:
- one or more processors; and
- a memory comprising instructions that, when executed by the one or more processors, cause the one or more processors to perform a process, the process comprising:
  - receiving a call from a caller;
  - generating a first session through a first channel associated with the caller when the call is received;
  - determining whether to send a push notification or a text message based on a type of device and a length of time a device associated with the caller has been registered with an organization;
  - sending a request for authentication credentials to the device associated with the caller,
  - wherein sending the request comprises generating a second session though a second channel associated with the caller, wherein the request for authentication credentials is sent to the device via the push notification or the text message; and
  - authenticating the caller to the first session using communication received during the second session through the second channel,
  - wherein the first channel and the second channel are different types of channels.

\* \* \* \* \*